June 12, 1956 J. F. COLEMAN 2,750,113

READ-IN CIRCUIT

Filed April 6, 1953 8 Sheets-Sheet 1

*INVENTOR.*
JOHN F. COLEMAN

*BY* Wesley De Bruin

ATTORNEY

June 12, 1956 J. F. COLEMAN 2,750,113

READ-IN CIRCUIT

Filed April 6, 1953 8 Sheets-Sheet 2

*INVENTOR.*
JOHN F. COLEMAN

*BY* Wesley De Bruin
ATTORNEY

June 12, 1956 J. F. COLEMAN 2,750,113

READ-IN CIRCUIT

Filed April 6, 1953 8 Sheets-Sheet 3

INVENTOR.
JOHN F. COLEMAN
BY Wesley De Bruin
ATTORNEY

INVENTOR.
JOHN F. COLEMAN
BY Wesley De Bruin
ATTORNEY

June 12, 1956 J. F. COLEMAN 2,750,113

READ-IN CIRCUIT

Filed April 6, 1953 8 Sheets-Sheet 5

*INVENTOR.*

JOHN F. COLEMAN

*BY* Wesley De Bruin

ATTORNEY

*INVENTOR.*
JOHN F. COLEMAN
*BY* Wesley De Bruin
ATTORNEY

June 12, 1956 J. F. COLEMAN 2,750,113

READ-IN CIRCUIT

Filed April 6, 1953 8 Sheets-Sheet 7

INVENTOR.
JOHN F. COLEMAN

BY Wesley De Bruin

ATTORNEY

June 12, 1956 J. F. COLEMAN 2,750,113

READ-IN CIRCUIT

Filed April 6, 1953 8 Sheets-Sheet 8

INVENTOR.
JOHN F. COLEMAN

BY Wesley De Bruin

ATTORNEY

United States Patent Office 2,750,113

Patented June 12, 1956

2,750,113

READ-IN CIRCUIT

John F. Coleman, Poughkeepsie, N. Y., assignor to International Business Machines Corporation, New York, N. Y., a corporation of New York Application April 6, 1953, Serial No. 346,976

14 Claims. (Cl. 235—61.11)

This invention relates generally to improvements in record controlled accounting machines and more particularly to an advanced form of circuit for reading data from a perforated card into electronic storage means.

A primary object of the invention is to provide a read-in circuit which operates at a high speed and requires a small number of components.

Another object of the invention is the provision of an electronic read-in circuit which is less subject to error.

A further object of the invention is an electronic read-in circuit which is less sensitive to transient pick-up.

A still further object of the invention is an electronic read-in circuit which is capable of reading in flight an upper and lower deck of information from a standard record card.

Another object of the invention is an electronic read-in circuit which is capable of reading in flight a multiple deck card wherein numeric information is recorded in each deck by punched holes in binary or other notation.

Yet another object of the invention is to provide a read-in circuit which is more compact.

A still further object of the invention is to provide an electronic read-in circuit which is simple and economical to produce.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 discloses a flow diagram of the novel read-in circuit.

In Figures 6 through 21 the ohmic value of each resistor is in kilohms (the number adjacent (the symbol designating a resistor) and the capacitive value of each capacitor is in micromicrofarads the number adjacent the symbol designating a capacitor) unless otherwise designated.

Figure 2:
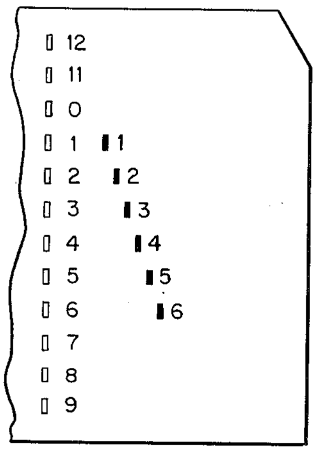
Fig. 2 shows a portion of a standard record card.

The invention will be briefly described with reference to Figs. 1, 1A and 2. A number of $$\frac{55}{4}$$

kilocycle pulses corresponding or equal to the particular digit punched in any given column of a standard record card, of the type shown in part in Fig. 2, will be fed into electronic storage means 23. Or, in other words, the number of $$\frac{55}{4}$$

kilocycle pulses fed into a factor storage unit during the particular digit index time will correspond to, or be equal to, the particular digit punched in any given card column of a standard record card.

Figures 1, 1A:
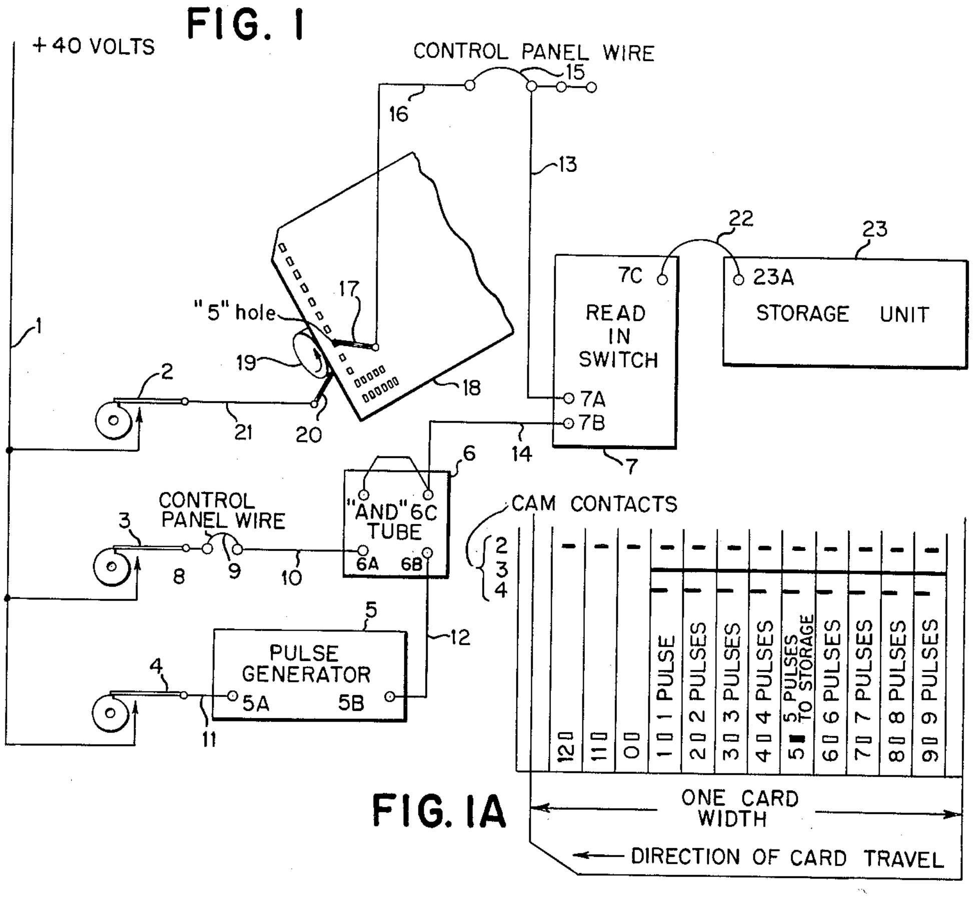
Fig. 1A is a timing chart for use with the device shown in Fig. 1.

Referring to Fig. 1 it is seen that lead 1 connects one side of cam contacts 2, 3 and 4 to the positive terminal of a 40 volt D. C. source. The other side of cam contacts 2, 3 and 4 are respectively connected, as follows: lead 21, contact brush 20, contact roll 19; lead 8, control panel wire 9, lead 10 to terminal 6A of "and tube" 6; lead 11 to terminal 5A of pulse generator 5. It is to be noted that record card 18 passes between contact roll 19 and read brush 17. Read brush 17 is connected through lead 16, control panel wire 15, and lead 13 to terminal 7A of read-in switch 7.

Pulse generator 5 of Fig. 1 is unconventional in that it delivers a burst of one or more $$\frac{55}{4}$$

kilocycle pulses under control of cam contacts 4. Cam contact 4 is synchronized with the passage of record card 18 under read brush 17, and with cam contacts 2 and 3. Cam contact 4 closes at a point in time just after each index card time and opens just before each mid-index card time. A timing chart of cam contact 4 is shown in Fig. 1A. All timing is with reference to the passage of a standard record card column under read brush 17.

As stated earlier, pulse generator 5 is controlled by cam contact 4, and as a result generator 5 delivers one pulse over lead 12 to terminal 6B of "and tube" 6 during (and approximately at the mid point of) index time 1. In like fashion, during mid-index time 2, two pulses are impressed on terminal 6B of "and tube" 6; during mid-index time 3, three pulses are impressed on terminal 6B; etc. To summarize: pulse generator 5 delivers 1, 2, 3, 4, 5, 6, 7, 8 and 9 pulses respectively at the corresponding mid-index points of a standard record card.

"And tube" 6 will be rendered operative only when both of its input terminals, namely 6A and 6B, are simultaneously conditioned. Terminal 6B is repeatedly conditioned by the individual pulses from pulse generator 5. Cam contact 3 is so synchronized with the passage of a record card under read brush 17 as to be closed during card index times 1 through 9. Reference is made to the timing chart shown in Fig. 1A. The closing of cam contact 3 conditions terminal 6A of "and tube" 6 from 1 through 9 card index time. It will now be apparent that the pulses from pulse generator 5 are permitted to pass through lead 12, "and tube" 6 and lead 14 to terminal 7B of "read-in" switch 7. Thus it will be seen that pulses appear at terminal 7B of "read-in" switch 7 in the following order: one pulse during card index time 1; two pulses during card index time 2; three pulses during card index time 3; and in like manner for card index times 4 through 9.

Still referring to Fig. 1, let it now be assumed for purpose of explanation that the particular card column passing under read brush 17 has a "five" hole punched in it. That is to say that the particular card column passing under read brush 17 has a hole punched within the confines of card index time 5, i. e. index point 5. From the timing chart (Fig. 1A) it is seen that during card index times 12, 11, 0, 1, 2, 3, 4, 5, 6, 7, 8 and 9, respectively, cam contact 2 closes and opens. However, it is only during card index time 5 that read brush 17 projecting through the punched "five" hole will be in electrical contact with contact roller 19. Thus during card index time 5 a circuit will be completed as follows: plus 40 volt terminal, lead 1, cam contact 2, lead 21, contact brush 20, contact roll 19, read brush 17, lead 16, control panel wire 15, and lead 13 to terminal 7A of "read-in switch" 7.

"Read-in switch" 7 must have its terminal 7A simultaneously conditioned by a positive potential of the order of 40 volts in order to pass the pulse, or pulses, which appear at its terminal 7B to storage unit 23. In view of the preceding discussion it will be apparent that this condition (i. e. positive 40 volts on terminal 7A) will only occur during index time 5 for the particular card column being read. Now bearing in mind that during card index time five, five pulses are impressed on terminal 7B, it will be seen that as a result of the punched hole "5" conditioning terminal 7A, during card index time five, five pulses are read through the "read-in switch" 7 into storage unit 23.

The above arrangement may be extended to a record card having a plurality of columns, for example 80 or 160.

Figure 3:
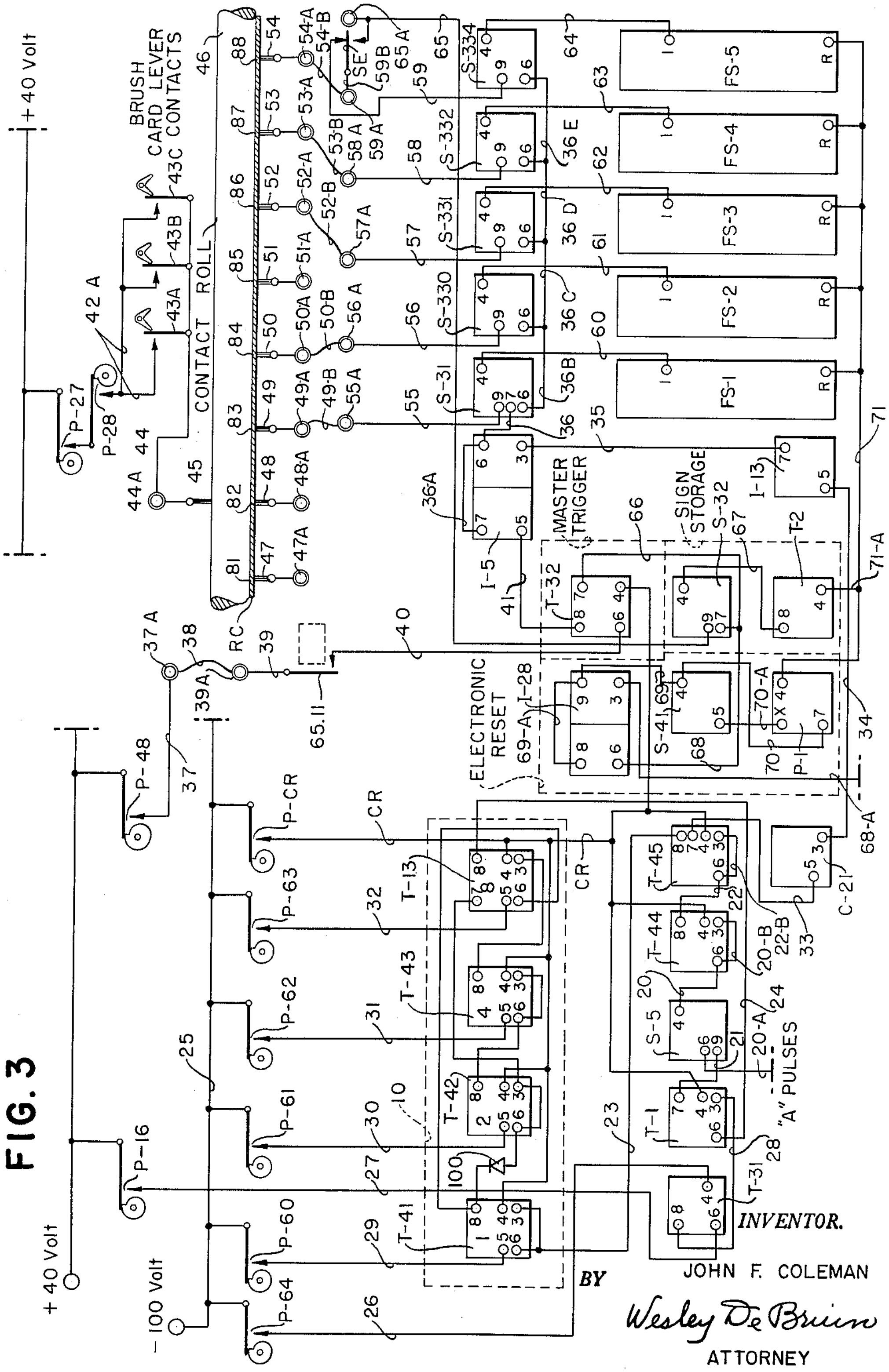
Fig. 3 is an embodiment of the novel read-in circuit to be used with the standard record card shown in part in Fig. 2.

A detailed explanation of the circuit of Fig. 3, which sets forth a practical embodiment of the invention (as was very briefly disclosed with regard to Figs. 1 and 1A) will now be undertaken.

Figure 5:
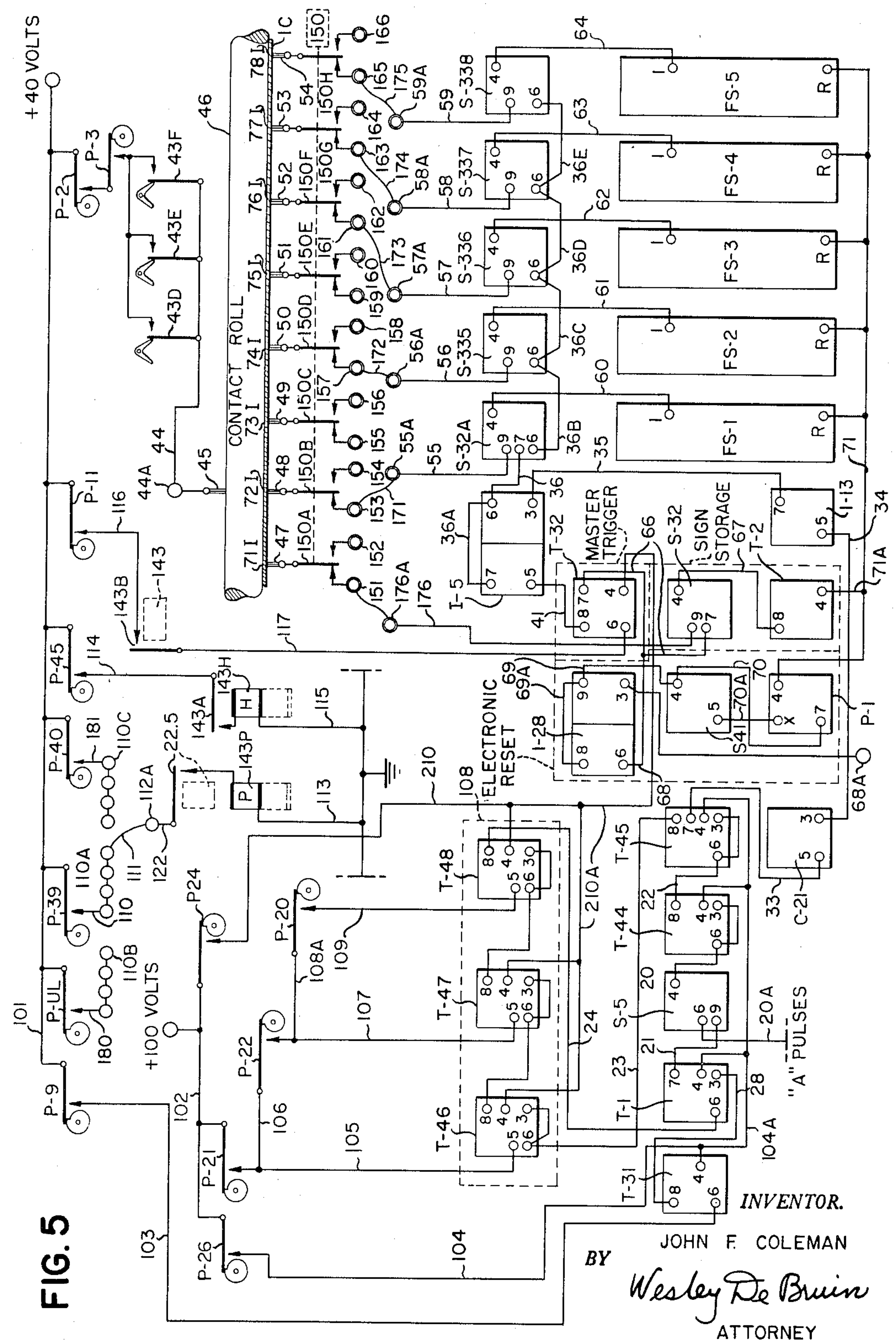
Fig. 5 is an embodiment of the novel read-in circuit to be used with the double-deck record card shown in part in Fig. 4.

The circuits of Figs. 3 and 5 utilize many electronic trigger circuits. Trigger circuits and their operation are well known in the art. Therefore, no detailed discussion of electronic trigger circuits "per se" will be undertaken. The drawing shows a detailed circuit diagram of each different trigger circuit used in the circuits of Figs. 3 and 5.

In chapter 10 (page 349) of "Theory and Applications of Electron Tubes" by Herbert J. Reich, published by McGraw-Hill Book Company in 1944, a general discussion of a basic type trigger circuit may be found.

Reference is also made to an article by Byron E. Phelps entitled "Dual-triode trigger circuits," published in the July 1945 issue of Electronics.

A trigger circuit has two states of equilibrium for fixed values of supply voltages and circuit components. The trigger circuit derives its name from the fact that it can be made to "trigger," i. e. switch, abruptly from one state of equilibrium to the other by means of small controlling voltages. A change in the voltage at the grids or anodes will result in a transfer of conduction from one tube to the other of a trigger circuit.

For the purpose of being consistent throughout the following description a trigger is referred to as "off" when its right side is conducting and as "on" when its left side is conducting. The initial position of all triggers disclosed herein is "off."

By definition, a voltage pulse is a shift in voltage. The pulse is a positive pulse if the voltage shift is in a positive direction, regardless of the original and final voltage values. Likewise, a negative pulse represents a voltage shift in a negative direction, regardless of the original and final voltage values. The voltage change is the amplitude of the pulse.

The circuit of Fig. 3 is used for reading numeric information from a standard record card of the type shown in part in Fig. 2. Hence a requirement of the pulse generator of Fig. 3 is that it deliver pulses in bursts of the following order: one pulse during index time 1; two pulses during index time 2; three pulses during index time 3; and in like fashion for index times 4 through 9.

The pulse generator of the device shown in Fig. 3 may be said to include the following components and their associated circuitry: cam contacts P-16, P-60, P-61, P-62, P-63, P-64 and P-CR; triggers T-1, T-13, T31, T-41, T-42, T-43, T-44 and T-45; and switch S-5.

Included within the pulse generator is a decade counter, namely, interconnected triggers T-41, T-42, T-43, T-13 and diode 100; all enclosed by broken line 10 in the drawing. The decade counter is generally of the types fully disclosed and claimed in the United States patent application of Leonard R. Harper, Ser. No. 202,120 (IBM Docket 3907), filed on December 21, 1950, and assigned to the same assignee as this application.

The pulse generator functions in the following manner, to deliver 1, 2, 3, 4, 5, 6, 7, 8 and 9 pulses (in bursts) at mechanically timed intervals synchronized with the movement of a standard record card. A source of "A" pulses, which is actually a source of square wave pulses of approximately 50 (+25 to −25) volts magnitude at a frequency of substantially 55 kilocycles is impressed, via lead 20A, upon terminal 6 of switch S-5. Switch S-5 is a pentagrid switch whose circuit is shown in detail in Fig. 12. In order for switch S-5 to pass negative pulses (of inverted "A" pulse type) to the binary input terminals 6 and 3, of trigger T-44, trigger T-1 must previously have been turned "on" so that terminal 9 of switch S-5 may be conditioned by a more positive potential obtained, via lead 21 from terminal 7 of trigger T-1. The circuit of trigger T-1 is shown in detail in Fig. 9.

Figure 6:
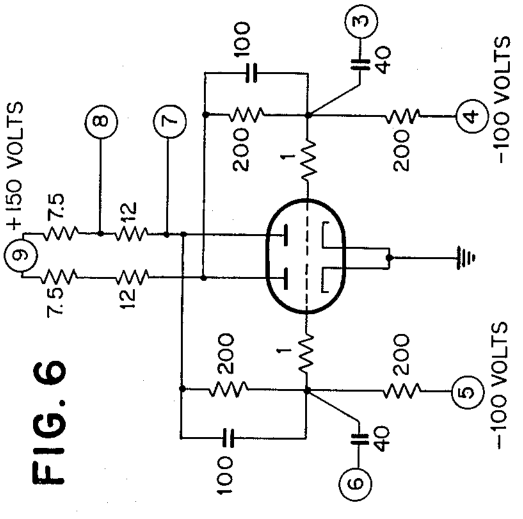
Fig. 6 is a detailed circuit diagram of a particular trigger circuit represented by blocks T–41, T–42, T–43, T–44 and T–45 of Fig. 3; and by blocks T–44, T–45, T–46, T–47 and T–48 of Fig. 5.
Figure 10:
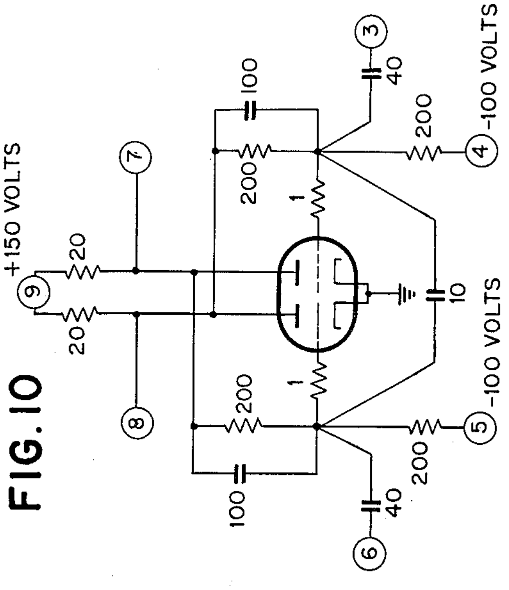
Fig. 10 is a detailed circuit diagram of a particular trigger represented by block T–2 in Figs. 3 and 5, respectively.
Figure 9:
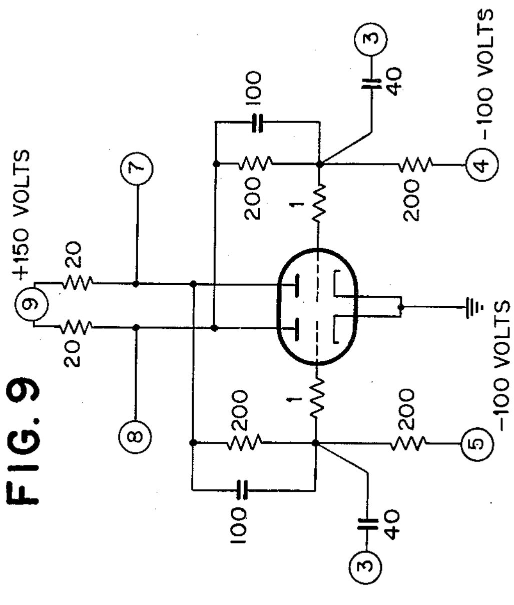
Fig. 9 is a detailed circuit diagram of a particular trigger represented by block T–1 in Figs. 3 and 5, respectively.

At this point trigger T–1 is turned "on" (by means disclosed hereinafter) and as a result switch S–5 is conditioned to pass pulses of inverted "A pulse" form from its terminal 4, through lead 20, to the binary connected input terminals 6 and 3 of trigger T–44. Trigger T–44 is connected from its terminal 8, via lead 22, to the binary connected input terminals 6 and 3 of trigger T–45. Fig. 6 of the drawing shows a detailed circuit diagram of like triggers T–44 and T–45. Actually triggers T–44 and T–45 constitute a four counter of negative pulses. Or in other words, for every fourth negative pulse impressed on terminals 3 and 6 of trigger T–44 there is a resulting negative output pulse appearing at terminal 8 of trigger T–45. Triggers T–44 and T–45 only respond to negative pulses. It will be noted from Figs. 3 and 6 that when trigger T–45 is switched to its "on" position a positive voltage pulse appears at terminal 7 of said trigger.

The negative output pulse of trigger T–45, terminal 8, is impressed, through lead 23, on binary connected input terminals 6 and 3 of trigger T–41. As stated earlier triggers T–41, T–42, T–43 and T–13, plus diode 100, comprise a negative voltage pulse decade counter; the input of which is binary connected terminals 6 and 3 of trigger T–41. Assuming that initially all of the triggers of the decade counter 10 are in the "off" position, then it will take 10 negative input pulses to the decade counter to obtain a negative output pulse from the decade counter, namely terminal 8 of trigger T–13. The negative output pulse of trigger T–13 is impressed, via lead 24, on input terminal 6 of trigger T–1. From an inspection of Fig. 6 it will be apparent that the impressing of a negative voltage pulse on terminal 6 of trigger T–1 will result in said trigger switching from its "on" position to its "off" position. As was pointed out earlier, in order for switch S–5 to pass pulses of inverted "A pulse" form, trigger T–1 must be in the "on" position. Therefore, it is seen that the negative output pulse from the decade counter 10 through the medium of turning "off" trigger T–1 effectively renders non-conductive (turns "off") switch S–5.

Attention is drawn to the fact that negative pulses appearing at terminal 8 of trigger T–45 are at a frequency of one-fourth that of the negative output pulses of switch S–5, terminal 4 thereof. Also, that the positive pulses which appear at terminal 7 of trigger T–45 are at a frequency equal to that of the negative pulses appearing at terminal 8 of said trigger but displaced in phase with respect thereto, the positive pulses at terminal 7 of trigger T–45 result from said trigger switching to its "on" position, whereas, the negative pulses appearing at terminal 8 of trigger T–45 result from said trigger switching to its "off" position. (Reference is made to Figures 3 and 6.) Further, when terminal 9 of switch S–5 is not conditioned (trigger T–1 being "off") then there is an absence of negative pulses at the aforementioned terminals of switch S–5 and trigger T–45.

Figure 3A:
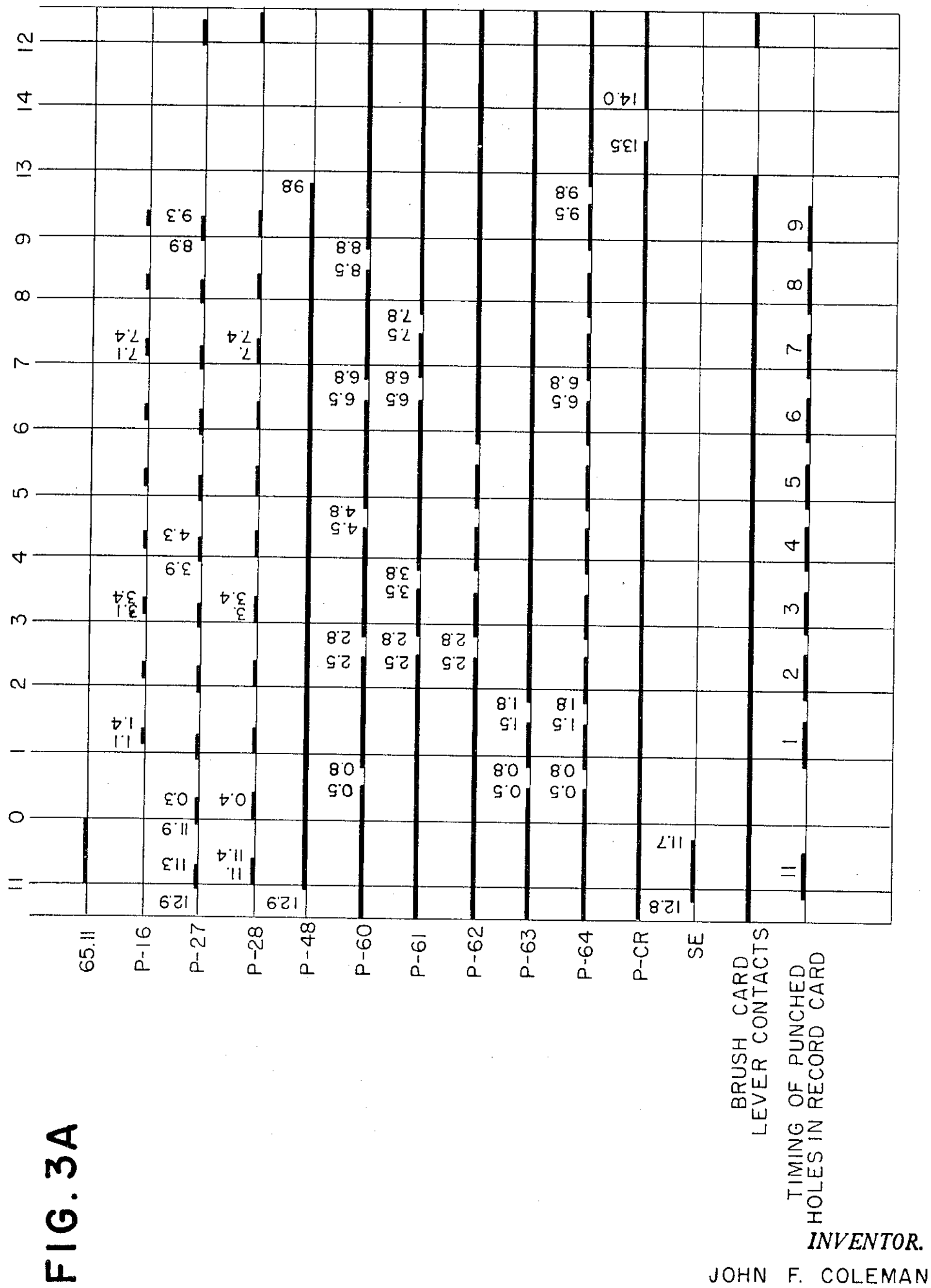
Fig. 3A is a timing chart for the cam contacts, relay contacts, etc. shown in Fig. 3.

It will now be explained how the pulse generator is conditioned by the operation of cam contacts P–16, P–64, P–60, P–61, P–62, P–63 and P–CR, to deliver a number of pulses per index point equal to the digit value of the card index point passing under the read brushes. Reference is made to the timing chart of Fig. 3A, wherein the axis of abscissas is used to set forth graphically card index times 12, 11, 0, 1, 2, 3, 4, 5, 6, 7, 8 and 9 as well as machine index times 13 and 14. The timing chart shown in Fig. 3A is for a 14 cycle point machine. The circuit of Fig. 3 is described as being embodied in a fourteen cycle point machine, but from the following discussion it will be apparent that by a modification of the timing the circuit may be used in a machine other than the fourteen cycle point type herein disclosed.

From Fig. 3A it is seen that cam contact P–64 breaks (opens) at card index time 0.5 and makes (closes) at card index time 0.8. Cam Contact P–64 has its transfer side connected through lead 25 to a −100 volt potential; the other side of cam contact P–64 is connected through lead 26 to terminal 4 of trigger T–31. From an inspection of Fig. 8 which shows a detailed circuit diagram of trigger T–31, it will be apparent that the opening of cam contact P–64 (thus removing the −100 volts impressed on terminal 4 of said trigger) causes trigger T–31 to switch to its "off" position. Again referring to Figs. 3 and 3A of the drawing it will be noted that when cam contact P–16 closes at card index time 1.1 this places, via lead 27, a positive forty volt potential on terminal 6 of trigger T–31 and results in said trigger being turned "on." From an inspection of Figs. 3 and 8 it will be seen that when trigger T–31 is turned "on" a negative pulse is impressed, via lead 28, on terminal 3 of trigger T–1.

The negative pulse impressed upon terminal 3 of trigger T–1 at approximately 1.1 card index time, due to trigger T–31 switching to its "on" position, causes T–1 to switch to its "on" position. As was shown earlier, the switching of trigger T–1 to its "on" position conditions terminal 9 of switch S–5. When terminal 9, switch S–5, is conditioned the "A" pulses impressed upon terminal 6 of said switch result in negative output pulses appearing at terminal 4 of said switch. It is to be recalled that triggers T–44 and T–45 constitute a four's counter, which responds to negative pulses only. Thus it is seen that for every four negative input pulses appearing at terminals 6 and 3 of trigger T–44, a single negative output pulse appears at terminal 8 and a single positive output pulse appears at terminal 7 of trigger T–45. (The positive pulse appearing at terminal 7 of trigger T–45 is phase displaced with respect to the negative pulse appearing at terminal 8 of said trigger.)

Again referring to the circuit diagram of Fig. 3 it will be seen that cam contacts P–60 and P–63 each have their transfer side connected through lead 25 to a −100 volt potential. The other side of cam contacts P–60 and P–63 are respectively connected as follows: through lead 29 to terminal 5 of trigger T–41; and through lead 32 to terminal 5 of trigger T–13. Thus it will be seen that the breaking (opening) of cam contacts P–60 and P–63 (at card index time 0.5, by removing the −100 volt potential from the respective terminals 5 of triggers T–41 and T–13) will result in said triggers switching to their respective "on" positions. The decade counter 10 is now so conditioned that the first negative input pulse from terminal 8 of trigger T–45 (occurring at approximately 1.1 card index time) will turn "off" triggers T–41 and T–13; triggers T–42 and T–43 remaining in their respective "off" positions. The switching of trigger T–13 from "on" to "off" will result in a negative output pulse from terminal 8 of said trigger, via lead 24, causing trigger T–1 to be switched "off." As was pointed out earlier, when trigger T–1 is in its "off" position then switch S–5 has its terminal 9 deconditioned, and the switch is non-conductive, i. e. non-responsive to "A" pulses impressed on terminal 6 of said switch.

From the immediately preceding description it will be seen that during card index time 1 a single negative output pulse from trigger T–45 effectively turns off the pulse generator. It is also to be noted that only a single positive output pulse appears at terminal 7 of trigger T–45 during card index time 1.

Now again referring to Figs. 3 and 3A it will be seen that at card index time 1.5 the opening of cam contact P–64 will result in trigger T–31 switching to its "off" position. Trigger T–1 is already in its "off" position and does not respond to positive pulses. The opening of cam contact P–63 at card index time 1.5 will switch trigger T–13 to its "on" position. The closing of cam contact P–63 at 1.8 has no effect on the position of trigger T–13. Now at 2.1 card index time cam contact P–16 is closed resulting in trigger T–31 switching to its "on" position. The switching of trigger T–31 to its "on" position results in trigger T–1 being switched to its "on" position. When trigger T–1 is "on" switch S–5 is conductive. Hence, there will be negative output pulses appearing at terminal 8 and positive output pulses appearing at terminal 7, of trigger T–45, until trigger T–1 is turned "off." With trigger T–13 "on" the decade counter 10 has a count of 8 stored in it. Hence after two negative pulses from trigger T–45 are fed to the input of the decade counter 10, the counter will have all its triggers in the "off" position. Trigger T–13 in switching to its "off" position will have passed a negative output pulse, via lead 24, to terminal 6 of trigger T–1, causing T–1 to switch to its "off" position. When T–1 is "off" then switch S–5 is non-conductive.

It will be noted that during card index time two, only two negative pulses appeared at terminal 8 and two positive pulses appeared at terminal 7 of trigger T–45.

It will now be apparent that prior to each card index time 1 through 9, the appropriate count (i. e. the ten's complement of the next card index position) is set into the decade counter 10, by means of certain of the cam contacts opening and thus turning "on" (i. e. switching "on") the proper triggers of the counters. Thus when a number of negative pulses corresponding to the particular card index value is read into the counter, the counter is reset to zero and the negative output pulse from the counter switches trigger T–1 to its "off" position. When T–1 is in its "off" position switch S–5 is non-conductive and hence no negative pulses appear at terminal 8 and no positive pulses at terminal 7 of trigger T–45.

Again referring to Figs. 3 and 3A of the drawing the following general observations are made.

Figure 8:
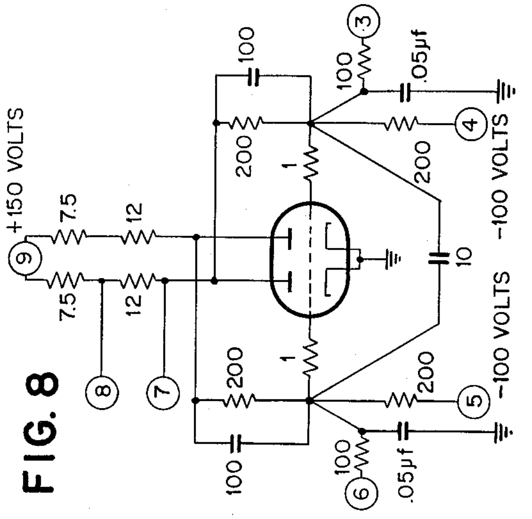
Fig. 8 is a detailed circuit diagram of a particular trigger circuit represented by block T–31 in Figs. 3 and 5, respectively.

Each closing of cam contact P–16 switches trigger T–31 to its "on" position; the opening of cam contact P–16 has no effect on the position of said trigger. Reference is also made to Fig. 8 of the drawing.

Each opening of cam contact P–64 switches trigger T–31 to its "off" position; the closing of cam contact P–64 has no effect on the position of said trigger. Reference is also made to Fig. 8.

Each opening of cam contact P–60 switches trigger T–41 to its "on" position; the closing of cam contact P–60 has no effect on the position of said trigger. Reference is also made to Fig. 6.

Each opening of cam contact P–61 switches trigger T–42 to its "on" position; the closing of cam contact T–61 has no effect on the position of said trigger. Reference is also made to Fig. 6.

Each opening of cam contact P–62 switches trigger T–43 to its "on" position; the closing of cam contact P–62 has no effect on the position of said trigger. Reference is also made to Fig. 6.

Figure 7:
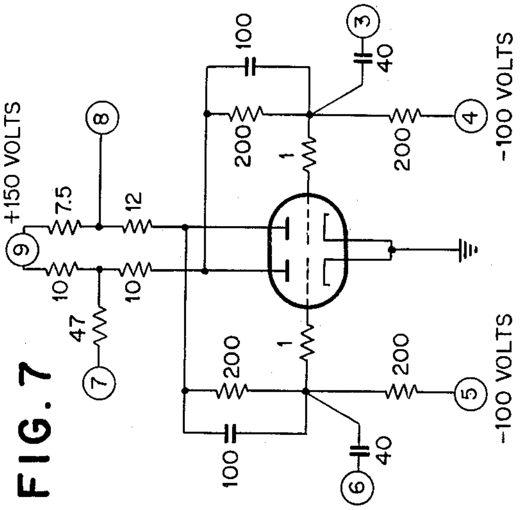
Fig. 7 is a detained circuit diagram of a particular trigger circuit represented by block T–13 in Fig. 3.

Each opening of cam contact P–63 switches trigger T–13 to its "on" position; the closing of cam contact P–63 has no effect on the position of said trigger. Reference is also made to Fig. 7.

Thus it will be apparent that the selective opening of the respective cam contacts P–60, P–61, P–62 and P–63, result in the proper count being set in the decade counter 10 just prior to each card index time 1 through 9.

It will also be seen that cam contacts P–16 and P–64 are respectively utilized to turn "on" and "off" trigger T–31 at the appropriate card index times during the card cycle.

Cam contact P–CR opens at card index time 13.5 and thereby effects the resetting of the following triggers: T–41, T–42, T–43, T–13, T–1, T–44, T–45 and T–32. A trigger is considered to be reset when it is in its "off" position.

The required cam openings and closings of the various cams, the setting of the decade counter, and overall operation of the pulse generator for each card index time 1 through 9 will now be briefly set forth.

*Card index time 1.*—Cam contact P–64 opens at card index time 0.5 resulting in trigger T–31 being switched to its "off" position. Cam contacts P–60 and P–63 open at card index time 0.5 to respectively switch to their "on" positions triggers T–41 and T–13. Cam contact P–16 closes at card index time 1.1 and results in trigger T–31 being switched to its "on" position. The switching of trigger T–31 to its "on" position results in trigger T–1 switching to its "on" position. When trigger T–1 is in its "on" position, terminal 9 of switch S–5 is conditioned. When switch S–5 is so conditioned, for every four "A" pulses impressed upon terminal 6 of said switch a negative output pulse appears at terminal 8 and a positive output pulse appears at terminal 7 of trigger T–45. The negative output pulse from terminal 8 of trigger T–45 is fed, via lead 23, to the input terminals, namely 6 and 3 of trigger T–41, of decade counter 10. Decade counter 10 has triggers T–41 and T–13 in their respective "on" positions. Therefore, the first negative input pulse to the decade counter switches triggers T–41 and T–13 to their respective "off" positions. The negative output pulse from trigger T–13, terminal 8, is impressed, via lead 24, on terminal 6 of trigger T–1, causing trigger T–1 to switch to its "off" position. Switch S–5 is non-conductive when trigger T–1 is in its "off" position. From the above discussion it is obvious that only a single positive output pulse will appear at terminal 7 of trigger T–45 during card index time 1.

*Card index time 2.*—Referring again to Figs. 3 and 3A it will be seen from the following description how the pulse generator functions to deliver two positive voltage pulses during card index time two. Cam contact P–64 opens at card index time 1.5 resulting in trigger T–31 being switched to its "off" position. Cam contact P–63 opens at card index time 1.5 to switch trigger T–13 of decade counter 10, to its "on" position. Cam contact P–16 closes at card index time 2.1 and results in trigger T–31 being switched to its "on" position. Trigger T–1 is switched to its "on" position as a result of trigger T–31 being switched "on." Switch S–5 now has its terminal 9 so conditioned, resulting from the fact that trigger T–1 is "on," that for every "A" pulse appearing at terminal 6 of said switch a negative output pulse will appear at terminal 4 of said switch. For every four negative voltage pulses appearing at terminal 4 of switch S–5 a negative voltage pulse appears at terminal 8 and a positive voltage pulse appears at terminal 7 of trigger T–45. From Fig. 6 it will be seen that the negative voltage pulses appearing at terminal 8 and the positive voltage pulses appearing at terminal 7, of trigger T–45 differ in magnitude, and they respectively result from said trigger being switched to its "off" position (i. e. right side of said trigger conductive) and to its "on" position (i. e. left side of said trigger conductive). Thus throughout the description it must be kept in mind that a negative voltage pulse appearing at terminal 8 lags in time (phase displaced) the corresponding positive pulse appearing at terminal 7 of trigger T–45. Since trigger T–13 is in its "on" position (digit 8 or 8 count in the decade counter) the second negative pulse from trigger T–45 will result in all 4 triggers of the decade counter being in their "off" position. When trigger T–13 of the decade counter switches "off," a negative pulse is fed from terminal 8 of said trigger to terminal 6 of trigger T–1, resulting in trigger T–1 switching to its "off" position. The switching "off" of trigger T–1 results in terminal 9 of switch S–5 being deconditioned; hence, no further negative pulses appear at terminal 4 of switch S–5. It is to be noted that during card index time 2, only two positive pulses appeared at terminal 7 of trigger T–45.

*Card index time 3.*—The pulse generator delivers three positive voltage pulses during card index time 3. The output of the pulse generator is taken from terminal 7 of trigger T–45.

The following sequential operation of the various cam contacts takes place to effect the delivery of three positive pulses during card index time 3. Cam contact P–64 breaks at card index time 2.5 to switch "off" trigger T–31.

Cam contacts P–60, P–61 and P–62 break at card index time 2.5 to respectively switch to their "on" position triggers T–41, T–42 and T–43. In brief, it may be said that the opening of cam contacts P–60, P–61 and P62 results in a 7 count being set in decade counter 10. Cam contact P-16 closes at card index time 3.1. Thus it is apparent that after 3 negative input pulses to said decade counter, a negative output pulse will appear at terminal 8 of trigger T–13. The operation of triggers T–31 and T–1, switch S–5, and triggers T–44 and T–45 is the same as for card index times 1 and 2, aforerecited, with the exception that during card index time 3 trigger T–1 is switched "off" and switch S–5 deconditioned after 3 positive output pulses from the pulse generator.

In fact, triggers T–31 and T–1, switch S–5, and triggers T–44 and T–45 function in the same sequence for card index time 1 through 9.

It is to be recalled that the decade counter will sequentially have set in it the ten's complement of the next card index position, as a result of the preselected timed opening of one or more of the following cam contacts P–60, P–61, P–62, and P–63. Therefore, as to card index times 4 through 9, the operation of the pulse generator will be set forth merely in outline form.

*Card index time 4.*—Cam contact P–64 breaks at card index time 3.5. Cam contacts P–61 and P–62 break at card index time 3.5. Cam contact P–16 makes at card index time 4.1. The overall result is 4 positive pulses appearing at terminal 7 of trigger T–45 during card index time 4.

*Card index time 5.*—Cam contact P–64 breaks at card index time 4.5. Cam contacts P–60 and P–62 break at card index time 4.5. Cam contact P–16 makes at card index time 5.1. As an overall result, 5 positive output pulses appear at the output terminal of the pulse generator, namely: terminal 7 of trigger T–45, during card index time 5.

*Card index time 6.*—Cam contact P–64 breaks at card index time 5.5. Cam contact P–62 breaks at card index time 5.5. Cam contact P–16 makes at card index time 6.1. Six positive output pulses thus appearing at terminal 7 of trigger T–45 during card index time 6.

*Card index time 7.*—Cam contact P–64 breaks at card index time 6.5. Cam contacts P–60 and P–61 break at card index time 6.5. Cam contact P–16 makes at card index time 7.1, the pulse generator, as a result, delivering 7 positive pulses during card index time 7.

*Card index time 8.*—Cam contact P–64 breaks at card index time 7.5. Cam contact P–61 breaks at card index time 7.5. Cam contact P–16 makes at card index time 8.1. Eight positive output pulses appear at terminal 7 of trigger T–45 during card index time 8.

*Card index time 9.*—Cam contact P–64 breaks at card index time 8.5. Cam contact P–60 breaks at card index time 8.5. Cam contact P–16 makes at card index time 9.1; the pulse generator delivering 9 positive pulses during card index time 9.

Now again referring to Fig. 3, it will be seen that cam contact P–48 has its transfer side connected to a positive 40 volt potential. The other side of cam contact P–48 is connected through lead 37, plug hub 37A, control panel wire 38, plug hub 39A, and lead 39 to the transfer side of relay contact 65.11. The other side of relay contact 65.11 is connected through lead 40 to terminal 6 of trigger T–32.

Trigger T–32 must be in its "on" position for pulses from the pulse generator to be utilized, i. e. to be inverted and passed by switch I–5. The above statement will be more fully appreciated at a latter point in the description.

Record cards are fed through the machine 12-edge leading. Thus card index times 12, 11 and 0 may be utilized in the control of trigger T–32. In the specific embodiment disclosed in Fig. 3, card index time 11 is utilized for such purpose. That is, relay contact 65.11 is closed during card index time 11. (Relay coil 65.11, not shown, is energized during card index time 11.) Since it is desired to effect the switching of trigger T–32 to its "on" position, and thereby through means hereinafter disclosed, accomplish factor storing from any or all columns of a record card, control panel wire 38 is connected as shown.

From an inspection of the timing chart shown in Fig. 3A it will be seen that cam contact P–48 is closed from card index time 12.9 through card index time 9.8. Thus, during card index time 11, a 40 volt positive potential is impressed via cam contact P–48, lead 37, plug hub 37A, control panel wire 38, plug hub 39A, lead 39, closed contact 65.11, lead 40, to terminal 6 of trigger T–32, resulting in said trigger being switched to its "on" position. The fact that trigger T–32 will be switched to its "on" position as a result of a positive 40 volt pulse being impressed upon its terminal 6 can readily be seen from an inspection of Fig. 11.

With trigger T–32 in its "on" position, a less positive potential is impressed from terminal 8 of said trigger, via lead 41, to terminal 5 of "negative-and" switch I–5. Switch I–5 requires this less positive potential on its terminal 5 in order for it to respond to the negative pulses that appear at its terminal 3. The circuit of switch I–5 is shown in detail in Fig. 17.

Negative pulses appear at terminal 3 of switch I–5 as a result of the following circuitry. As was shown earlier, the pulse generator delivers 1 positive pulse at approximately 1.1 card index time; 2 positive pulses at approximately 2.1 card index time; 3 positive pulses at approximately card index time 3.1; and the corresponding number of positive pulses at the corresponding card index time for card index times 4 through 9. From Fig. 3, it will be seen that the positive output pulses from the pulse generator are transmitted via lead 33, cathode follower terminal 5, cathode follower C–21, cathode follower terminal 3, lead 34, inverter switch terminal 5, inverter switch I–13, inverter switch terminal 7, and lead 35, to terminal 3 of "negative-and" switch I–5. The circuit of cathode follower C–21 is shown in detail in Fig. 13. The circuit of inverter switch I–13 is shown in detail in Fig. 18.

Figure 17:
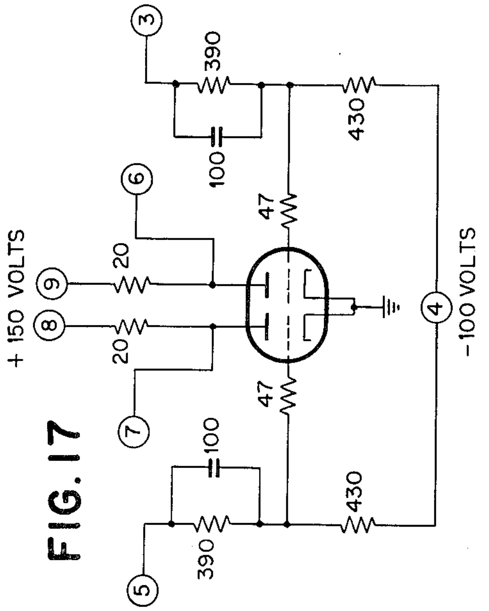
Fig. 17 is a detailed circuit diagram of a particular electronic switch, which may be referred to as an inverter switch, and is also known in the art as a "negative and" switch. The switch shown in Fig. 17 is represented by block I–5 in Figs. 3 and 5, respectively.

It will now be seen from an inspection of Fig. 17 that when the potential on terminal 5 of switch I–5 is reduced as a result of trigger T–32 being in its "on" position, that every negative pulse impressed on terminal 3 of said switch results in a positive output pulse from commonly connected terminals 6 and 7 of said switch being impressed through lead 36 on terminal 7 of switch S–31.

To recapitulate, the positive output pulses from the pulse generator pass through cathode follower C–21 and result in a like number of positive pulses appearing on lead 34. The positive pulses appearing on lead 34 pass through inverter switch I–13 and are transformed by said switch into a like number of negative pulses which in turn are transmitted through lead 35 to terminal 3 of switch I–5. It is to be noted that for each positive output pulse from the pulse generator a single negative pulse appears at terminal 3 of "negative-and" switch I–5. One of the main purposes for utilizing cathode follower C–21 and inverter switch I–13 is to avoid excessive loading of trigger T–45.

A brief inspection of Fig. 17 of the drawing will be helpful in understanding how "negative-and" switch I–5 functions. It will be noted that the switch consists essentially of a pair of triodes connected in parallel, i. e. the cathode of each triode is connected to ground; and from Fig. 3 it will be seen that lead 36A interconnects terminals 6 and 7, or in other words connects in common the plate of each triode. Each triode has its grid connected to an intermediate point on an impedance network. The impedance network for each grid is the same as will be seen from Fig. 17. One end of each impedance network (terminal 4, Fig. 17) is connected to a minus 100 volt potential. The other end of each impedance network, namely, terminals 5 and 3, respectively, are connected as stated earlier. It will now be seen that in order for the potential at the commonly connected plates to rise, both triodes will have to be non-conductive, since their plates are connected in common. In order for both triodes to be non-conductive and thereby result in a positive output pulse on lead 36, the potential impressed upon terminals 3 and 5 must respectively go in a negative direction, each a sufficient amount, in order to result in the bias upon the respective grids of the two tubes being reduced to such an amount as to cut-off said triodes.

With trigger T–32 in its "on" position, terminal 5 of switch I–5 is conditioned; and as a result, the negative pulses appearing at terminal 3 of said switch are converted by said switch into positive pulses (corresponding in number and time to the output pulses of the pulse generator) and are transmitted via lead 36 to terminal 7 of switch S–31. Now it will be apparent that with trigger T–32 in its "on" position, one positive pulse will appear at terminal 7 of switch S–31 at approximately card index time 1.1. At approximately card index time 2.1, two positive pulses will appear at terminal 7 of switch S–31. In short, the following sequence of positive pulses appear at terminal 7 of switch S–31: one at approximately card index time 1.1; two at approximately card index time 2.1; three at approximately card index time 3.1; four at approximately card index time 4.1; five at approximately card index time 5.1; six at approximately card index time 6.1; seven at approximately card index time 7.1; eight at approximately card index time 8.1; and nine at approximately card index time 9.1.

Figures 20, 21:
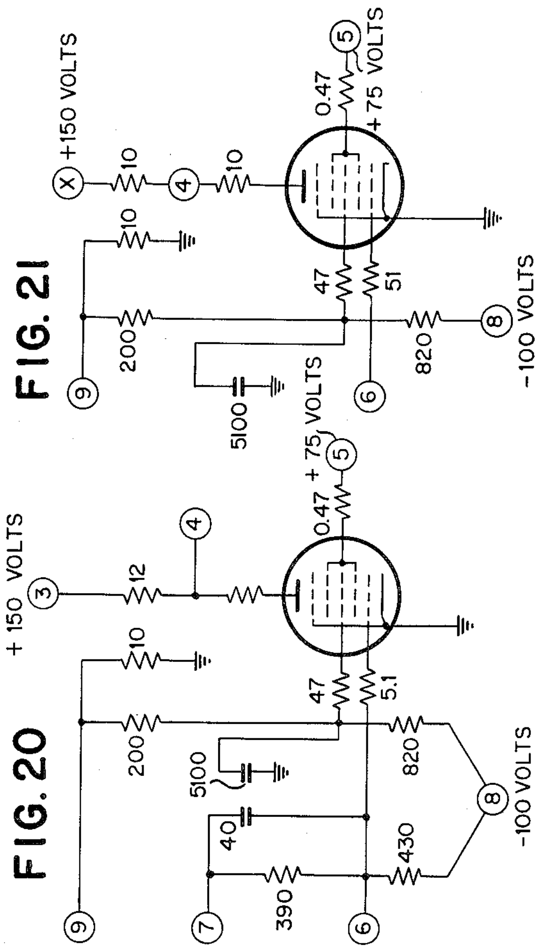
Fig. 20 is a detailed circuit diagram of a particular electronic switch and is represented by block S–31 in Fig. 3.
Fig. 21 is a detailed circuit diagram of a particular electronic switch and is represented by blocks S–330, S–331, S–332 and S–334 in Fig. 3 and by blocks S–335, S–336, S–337 and S–338 in Fig. 5.
Figure 19:
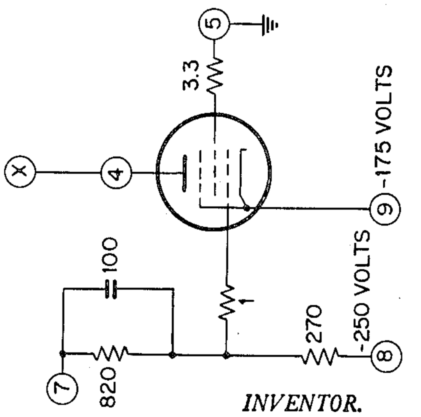
Fig. 19 is a detailed circuit diagram of a particular power unit and is represented by block P–1 in Figs. 3 and 5, respectively.

From an inspection of Fig. 20 it will be seen that switch S–31 utilizes a pentagrid tube. The operation of electronic switches of this generic type is well known in the art and therefore will only briefly be reviewed. In order for switch S–31 to be conductive, it must have its terminals 7 and 9 properly conditioned by a positive potential of proper magnitude impressed upon each of said terminals. It is to be noted that terminals 7 and 6 of switch S–31 are connected through a parallelly connected resistor and capacitor. Hence, the positive pulses impressed on terminal 7 appear at terminal 6 in similar form but of different (i. e. lesser) magnitude.

Referring briefly to Fig. 3 it will be seen that terminals 6 of switches S–31, S–330, S–331, S–332 and S–334 are effectively connected in common by means of interconnecting leads 36B, 36C, 36D and 36E. Thus each positive pulse impressed upon terminal 6 of switch S–31 is also impressed upon terminal 6 of each of the switches S–330, S–331, S–332 and S–334.

From Fig. 21 it will be seen that switches S–330, S–331, S–332 and S–334, utilize a pentagrid tube in much the same manner as switch S–31, with the exception of terminal 7 and its associated circuitry. That is, switches of the S–330 series, as shown in Figs. 3 and 21, in order to be conductive must have their terminals 6 and 9 properly conditioned by a positive potential of suitable magnitude impressed respectively thereon.

Now again referring to Figs. 3 and 3A, it will be seen that serially connected cam contacts P–27 and P–28 are effectively closed during the following periods of the machine cycle: card index time 11.0 to 11.3; card index time 0.0 to 0.3; card index time 1.0 to 1.3; card index time 2.0 to 2.3; card index time 3.0 to 3.3; card index time 4.0 to 4.3; card index time 5.0 to 5.3; card index time 6.0 to 6.3; card index time 7.0 to 7.3; card index time 8.0 to 8.3; card index time 9.0 to 9.3; and card index time 12.0 to 12.3. Actually, circuit breakers or cam contacts P–27 and P–28 which are serially connected through lead 42 are utilized to keep the read brushes (hereinafter more fully disclosed) from making and breaking the circuit which is completed when a punched hole in the record card is read. From Fig. 3 it will be seen that cam contact P–28 is serially connected through lead 42A to one side of parallelly connected brush card lever contacts 43A, 43B and 43C. The other side of the parallelly connected brush lever contacts are connected through lead 44, plug hub 44A and contact brush 45 to contact roll 46. Brush card lever contacts 43A, 43B and 43C will be closed when a record card is in position under the read brushes. The actuating mechanism for the card lever contacts 43A, 43B and 43C is not shown. Mechanisms of this general type are well known in the art. In brief, the purpose of brush lever contacts 43A, 43B and 43C is to avoid the completion of a circuit through the contact roll and read brushes, should there fail to be a record card in read position when according to machine time (card index time) a record card should be in the read position. The function of the brush card lever contacts will appear more clearly from the description to follow.

In Fig. 3 a record card bearing reference character RC is shown schematically as being disposed between contact roll 46 and read brushes 47, 48, 49, 50, 51, 52, 53 and 54. The record card is of the standard type, namely, 12 index positions, shown in part in Fig. 2. From an inspection of Fig. 3 it will be seen: that read brush 49 is connected through plug hub 49A, control panel wire 49B, plug hub 55A, and lead 55 to terminal 9 of switch S–31; that read brush 50 is connected through plug hub 50A, control panel wire 50B, plug hub 56A, and lead 56, to terminal 9 of switch S–330; that read brush 52 is connected through plug hub 52A, control panel wire 52B, plug hub 57A, and lead 57 to terminal 9 of switch S–331; that read brush 53 is connected through plug hub 53A, control panel wire 53B, plug hub 58A, and lead 58 to terminal 9 of switch S–332; that read brush 54 is connected through plug hub 54A, control panel wire 54B, plug hub 59A, lead 59B, the normally closed contact of contacts SE and lead 59 to terminal 9 of switch S–334. With reference to contacts SE, i. e. "sign entry" contacts, it is to be noted that said contacts have a normally closed contact which is transferred only during card index time 11. The transfer contact of contacts SE may be transferred as a result of cam actuating means or a relay coil (during card index time 11). The purpose of contacts SE will more clearly appear from the hereinafter described sign entry storage means.

Now again referring to Fig. 3 it will be seen that output terminal 4 of switch S–31 is connected through lead 60 to input terminal 1 of factor storage unit FS–1; that output terminal 4 of switch S–330 is connected through lead 61 to input terminal 1 of factor storage unit FS–2; that output terminal 4 of switch S–331 is connected through lead 62 to input terminal 1 of factor storage unit FS–3; that output terminal 4 of switch S–332 is connected through lead 63 to input terminal 1 of factor storage unit FS–4; that output terminal 4 of switch S–334 is connected through lead 64 to input terminal 1 of factor storage unit FS–5. The factor storage units FS–1, FS–2, FS–3, FS–4 and FS–5 are shown as block diagrams, since they may actually be any form of electrical storage means capable of storing negative pulses of the magnitude and frequency that switches S–31, S–330, S–331, S–332 and S–334 will deliver from their respective terminals (4) as a result of said switches being rendered conductive. For example, factor storage units FS–1, FS–2, FS–3, FS–4 and FS–5 could each essentially comprise an electronic counting circuit of the type disclosed in United States Patent 2,584,811, granted to Byron E. Phelps on February 5, 1952, and of common assignee with this U. S. patent application. Additional factor storage means, of the type that could be used with the circuit of Fig. 3, is disclosed in each of the following United States patents: No. 2,562,591, granted to John L. Wagner et al. on July 31, 1951; No. 2,558,936, granted to Arthur H. Dickinson on July 3, 1951; No. 2,594,742, granted to Arthur H. Dickinson on April 29, 1952.

Now referring to Fig. 3 and particularly record card RC, shown in part, it will be seen that no control panel wires are connected to plug hubs 47A, 48A and 51A. Read brush 47 is so positioned that it would read column 81 of a standard record card. Read brush 48 is positioned to read column 82 of a standard record card. In like fashion read brushes 49, 50, 51, 52, 53 and 54 are respectively positioned to read columns 83, 84, 85, 86, 87 and 88 of a standard record card. By a standard record card is meant a record card having 12 index positions per column of the type shown in part in Fig. 2. Record card RC is a standard record card and passes under the read brushes 12 edge first. As viewed in Fig. 3, record card RC's direction of travel would be perpendicular to and out of the paper.

Now for purposes of explanation, let us assume that record card RC has a nine hole punched in its column 83; a two hole punched in column 84; a one hole punched in its column 86; a three hole punched in its column 87; and a five hole punched in its column 88. Further, let us assume that it is desired to store the digit value punched in card columns 83, 84, 86, 87 and 88 of record card RC. As stated earlier, cam contact P–48 is closed from card index time 12.9 to card index time 9.8, and since it is desired to effect storage from said record card columns control panel wire 38 will be connected as shown in Fig. 3. Relay contact 65.11 will be closed during card index time 11 (by means which could consist of a relay wired through a read brush or energized by cam action in conjunction with a cam contact). A means for closing contact 65.11 during card index time 11 is not herein disclosed but is well known in the art. Thus, at card index time 11 trigger T–32 will be switched to its "on" position as a result of a 40 volt potential being impressed via cam contact P–48, lead 37, plug hub 37A, control panel wire 38, plug hub 39A, lead 39, relay contacts 65.11, and lead 40, to terminal 6 of said trigger. When trigger T–32 is in its "on" position the potential on terminal 5 of switch I–5 is substantially reduced, thus conditioning said terminal of said switch.

Now referring to the earlier discussion of the pulse generator it will be recalled that negative pulses appear at terminal 3 of switch I–5 in the following order: 1 pulse at approximately card index time 1.1; 2 pulses at approximately card index time 2.1; 3 pulses at approximately card index time 3.1; 4 pulses at approximately card index time 4.1; and a corresponding number of pulses at corresponding card index times for card index positions 5 through 9. Since switch I–5 has its terminal 5 conditioned (i. e., less positive potential thereon by virtue of trigger T–32 being on) every negative pulse appearing on terminal 3 of said switch results in a positive pulse appearing via lead 36 on terminal 7 of switch S–31. As was pointed out earlier, terminals 7 and 6 of switch S–31 are so inter-connected that for every positive pulse appearing on terminal 7 of said switch a corresponding positive pulse will appear on terminal 6 of said switch; and as a result of leads 36B, 36C, 36D and 36E, every positive pulse appearing on terminal 6 of switch S–31 also appears on terminal 6 of each of the switches S–330, S–331, S–332 and S–334. It will now be apparent that positive pulses are impressed on terminals 6 respectively of the following switches, S–31, S–330, S–331, S–332 and S–334, in number and card index time as follows: 1 pulse at approximately card index time 1.1; 2 pulses at approximately card index time 2.1; 3 pulses at approximately card index time 3.1; 4 pulses at approximately card index time 4.1; 5 pulses at approximately card index time 5.1; 6 pulses at approximately card index time 6.1; 7 pulses at approximately card index time 7.1; 8 pulses at approximately card index time 8.1; and 9 pulses at approximately card index time 9.1.

It is to be kept in mind that all timing is with regard to the passage of the record card RC under the read brushes.

Let us now assume that card index positions 12, 11 and 0 of record card RC have passed under the read brushes and that card index positions 1, 2, 3, 4, 5, 6, 7, 8 and 9 are yet to be read. During card index time 1, read brush 52 will make contact through the punched hole in the 1 position of record card column 86 with contact roll 46, resulting in a positive 40 volt potential being impressed on terminal 9 of switch S–331 during card index time 1.0 to 1.3. That is, a circuit is completed from a positive 40 volt potential through cam contact P–27, cam contact P–28, lead 42A, card lever contacts 43A, 43B, 43C, lead 44, plug hub 44A, contact brush 45, contact roll 46, read brush 52, plug hub 52A, control panel wire 52B, plug hub 57A, and lead 57 to terminal 9 of switch S–331. Now, since terminal 9 of switch S–331 is conditioned by a positive 40 volt potential during card index time 1.0 to 1.3, the positive pulse appearing at terminal 6 of said switch at approximately card index time 1.1 will result in a negative pulse from terminal 4 of said switch being impressed via lead 62 to input terminal 1 of factor storage unit FS–3. Thus, due to a punched hole appearing in the 1 position of card index column 86, of record card RC, a single negative pulse is impressed on input terminal 1 of factor storage unit FS–3 resulting in said storage unit having a 1 count registered in it.

During card index time 2, the punched hole in the 2 position of card column 84 of record card RC will be read by read brush 50 and result in a positive 40 volt potential being impressed on terminal 9 of switch S–330 during card index time 2.0 to 2.3. That is, a circuit is completed from the positive 40 volt potential through cam contact P–27, cam contact P–28, lead 42A, brush card lever contacts 43A, 43B, 43C, lead 44, plug hub 44A, contact brush 45, contact roll 46, read brush 50, plug hub 50A, control panel wire 50B, plug hub 56A, and lead 56 to terminal 9 of switch S–330. Terminal 9 of switch S–330 is thereby conditioned by a positive 40 volt potential during card index time 2.0 to 2.3, and therefore the two positive pulses appearing at terminal 6 of said switch at approximately card index time 2.1 result in 2 negative output pulses from terminal 4 of said switch being impressed, via lead 61, on input terminal 1 of factor storage unit FS–2. Thus, it will be seen that the punched "2" hole appearing in record card column 84 results in the entry of a 2 count into factor storage unit FS–2.

During card index time 3, read brush 53 will make contact through the punched hole in the 3 position of card column 87 of the record card and result in a positive 40 volt potential being impressed on terminal 9 of switch S–332 during card index time 3.0 to 3.3. Since terminal 9 is thereby conditioned, the 3 positive pulses impressed upon terminal 6 of switch S–332 at approximately 3.1 card index time will result in 3 negative pulses from terminal 4 of said switch being impressed, via lead 63, on input terminal 1 of factor storage unit FS–4. Thus a 3 count will be stored in factor storage unit FS–4 as a result of the punched "3" hole existing in card column 87 of record card RC.

No entry will be made to the storage units during card index time 4 since none of the card columns, namely 83, 84, 86, 87 and 88 have a "4" hole punched in them. Card columns 81, 82 and 85 can be ignored since as will be seen from Fig. 3 read brushes 47, 48 and 51 are not connected.

During card index time 5, read brushes 54 will make contact through the punched hole in the 5 position of card column 88 of the record card and result in a positive 40 volt potential being impressed on terminal 9 of switch S–334 during card index time 5.0 to 5.3. (It is to be kept in mind that contacts SE are only transferred during card index time 11.) The 5 positive pulses appearing at terminal 6 of switch S–334 at approximately card index time 5.1 will result in 5 negative pulses from terminal 4 of said switch being impressed, via lead 64, on input terminal 1 of factor storage unit FS–5. Thus, factor storage unit FS–5 has a 5 count stored in it as a result of the punched "5" hole appearing in card column 88 of record card RC.

Card index times 6, 7 and 8 will not result in any entry into the storage units for the reason that no punched 6, 7 and 8 holes respectively will be read. (As to card index times 4, 6, 7 and 8, it will be recalled that the illustrative example arbitrarily chosen for purpose of explanation did not include any punched holes of the order 4, 6, 7 and 8, respectively.) However, it is to be pointed out that the unit is capable of storing any digit from 1 through 9 and therefore any of the card column positions 1 through 9 could be punched and the value effectively stored.

During card index time 9, read brush 49 will make contact through the punched hole in the 9 position of card column 83 of the record card and result in a positive 40 volt potential being impressed on terminal 9 of switch S–31 during card index time 9.0 to 9.3. Thus, the 9 positive pulses appearing at terminal 6 of switch S–31 at approximately card index time 9.1 will result in 9 negative pulses from terminal 4 of said switch being impressed, via lead 60, on input terminal 1 of factor storage unit FS–1. Thus, factor storage unit FS–1 has a 9 count stored in it as a result of the punched "9" hole appearing in card column 83 of record card RC.

The means by which the read-in circuit takes cognizance of whether or not a number read from the record card into the storage means is "plus" or "minus" will now be disclosed. It will be recalled that in the aforerecited example the storage units FS–1, FS–2, FS–3, FS–4 and FS–5, respectively, had stored in them at the end of card index time 9 the following digits: 9, 2, 1, 3 and 5. Let us assume that the digits stored represented the number 92,135. For all intents and purposes at this point in the discussion the number 92,135 could be either plus or minus. Let us assume that the number is minus. Then there will be a hole punched in the 11 position of card column 88 of record card RC, to signify that the number or quantity is negative. Now referring to Fig. 3 and keeping in mind that contacts SE are transferred only during card index time 11, then it will be seen that a circuit is completed such that a positive 40 volt potential is impressed upon terminal 9 of switch S–32. The afore-mentioned circuit is as follows: positive 40 volt potential, cam contact P–27, cam contact P–28, lead 42A, brush card lever contacts 43A, 43B, 43C, lead 44, plug hub 44A, contact brush 45, contact roll 46, read brush 54, plug hub 54A, lead 54B, plug hub 59A, lead 59B (transferred), contact SE, and lead 65 to terminal 9 of switch S–32. Switch S–32 utilizes a pentagrid tube and is shown in detail in Fig. 14 of the drawing. Electronic switches of this generic type are well known. Switch S–32 will be rendered conductive only as a result of both terminals 9 and 7 being conditioned by the proper positive potential being impressed upon them respectively. Now it will be recalled that trigger T–32 was switched to its "on" position during card index time 11 in order to condition terminal 5 of switch I–5. However, a second function of trigger T–32 is to impress from its terminal 7, via lead 66, a positive potential on terminal 7 of switch S–32. When trigger T–32 is "on," the potential impressed on terminal 7 of switch S–32 is more positive so as to condition said terminal. Thus, when the 40 volt potential is impressed upon terminal 9 of switch S–32 the switch is rendered conductive and the potential at terminal 4 of said switch drops. Now referring to Fig. 3 it will be seen that the drop in potential at terminal 4 of switch S–32 is impressed, via lead 67, to terminal 3 of trigger T–2, resulting in trigger T–2 switching to its "on" position. The circuit of trigger 2 is shown in detail in Fig. 10 of the drawing, and as will immediately be apparent to those skilled in the art, trigger T–2 is switched "on" as a result of "plate pull-over action" when switch S–32 is conductive. In summary, it may be said that when a record card is punched in such a manner as to indicate a negative quantity trigger T–2 will be switched "on." Trigger 2 may be referred to a sign storage trigger.

The number minus 92,135 is now effectively stored at the end of card index time 9. Means for reading the digits from storage are well known in the art and are not disclosed as they are not a part of the novel device herein disclosed and claimed. However, it is pointed out that once a number is stored in electronic storage means it is in very convenient form to be read out and utilized by an electronic calculator. Further, since the means for reading out information from electronic storage is usually done by other electronic means, the time necessary to accomplish the complete read-out from storage is comparatively short. In many applications one-half of a card index time, for example, card index time 13 through 13.5 is adequate to accomplish read-out from the electronic storage means.

Reference is made to the circuit of Fig. 3 and to the timing chart of Fig. 3A. To those skilled in the art, it will immediately be apparent that numerous changes can be made in order to adapt the read-in circuit to the particular conditions under which it is sought to be utilized.

Merely for example, without any intent to be all inclusive, the following changes or modifications are pointed out. Plug hub 65A could be connected by a control panel wire to a plug hub of a read brush and the sign entry taken from any of the following positions of the card column: 11, 0, and 1 through 9. In Fig. 3 the device is shown with a capacity of a 5 order number. It is obvious how by additional components the device could be extended to read and store information from a plurality of record card columns up to and beyond 80. Further, a plurality of independent sign storage means may be used with the reading of a single record card. The storage means for factor storing may be modified by converting the negative pulses by electronic means into magnetic pulses and storing them on a magnetic tape or drum. Further, the particular trigger, switch, and cathode follower circuits utilized by the device of Fig. 3 are those which have been found to operate with a high degree of reliance and accuracy but are by no means the only circuits of that type that could be utilized.

The electronic reset means will now be disclosed. With reference particularly to the factor storage units it will be apparent that they must be reset (i. e., 0 count in them) before entry. If an entry to storage is to be made from each successive record card, then at the latest just prior to card index time 1 the factor storage units must be reset. Now recalling that by card index time 9.5 the entry to storage from the particular record card being read is completed, then once the information stored is utilized and it is desired to use the storage means with regard to the successive record card, then the storage means must be reset. For purpose of explanation, card index time 13.5 will be considered an appropriate time to effect reset of the storage means. Now referring to Fig. 3, "positive or" switch I–28, switch S–41, and power unit P–1, comprise the electronic reset means. A detailed circuit of switch I–28, switch S–41, and power unit P–1 are respectively shown in Figs. 16, 15 and 19. From Fig. 16 it will be seen that I–28 consists of a pair of triodes connected in parallel (lead 69A in Fig. 3 connecting in common the plates of said triodes to the output lead 69). The grids of the respective triodes of switch I–28 are so inter-connected, plus the parallel connections of the respective cathodes and anodes of the triodes that a positive pulse of either terminal 6 or 3 of said switch will result in a negative output pulse on lead 69. A negative output pulse on lead 69 will so depress the potential on terminal 4 of switch S–41 and via lead 70 on terminal 7 of power unit P–1, that the potential on reset lead 71 will rise for a short time from approximately minus 100 volts to somewhere near 0 volts. The rise in potential on lead 71 is utilized to reset factor storage units FS–1, FS–2, FS–3, FS–4 and FS–5. Observe that lead 71 is connected between terminal 4 of power unit P–1 and the reset terminal R of each of the factor storage units. Now again referring to Fig. 3, it will be seen that when trigger T–32 is switched "on" at approximately card index time 11 a positive pulse is transmitted from terminal 7 of said trigger via leads 66 and 68 and impressed on terminal 6 of switch I–28. By the immediately preceding sequence of operations the positive pulse on terminal 6 will accomplish reset of the storage units at approximately card index time 11. However, if it is desirable to accomplish reset of the storage means at an earlier time, for example card index time 13.5, a positive pulse on lead 68A and thereby impressed on terminal 3 of switch I–28 will likewise accomplish reset in the manner recited above. In summary, it can be said that when trigger T–32 is switched "on" the positive pulse impressed, via leads 66 and 68, on terminal 6 of switch I–28 results in a negative output pulse from terminal 9 of said switch which will through the medium of interconnected switch S–41 and power unit P–1 plus lead 71 effect electronic reset of storage units FS–1, FS–2, FS–3, FS–4 and FS–5. It must be kept in mind, however, that reset can be accomplished at any time by impressing a positive potential via lead 68A on terminal 3 of switch I–28.

From Fig. 3 it will be seen that terminal 4 of sign storage trigger T–2 is connected through lead 71A to reset lead 71. Thus, it is apparent that whenever the factor storage units FS–1, FS–2, FS–3, FS–4 and FS–5 are reset, trigger T–2 is also reset, i. e. switched to its "off" position. The circuit of sign storage trigger T–2 is shown in detail in Fig. 10.

The resetting of those triggers of the pulse generator of Fig. 3 that require resetting is effected by cam contact P–CR and lead CR. From the earlier discussion of the decade counter 10 it will be apparent that the respective triggers of said counter will be in the proper position at the latest at the end of the first card cycle, but to merely insure that triggers T–1, T–44, T–45, T–41, T–42, T–43, T–32 and T–13 are all in their "off" position initially, the respective terminals 4 of said triggers are connected through lead CR and cam contact PCR to a minus 100 volt potential. Cam contact PCR opens only at card index time 13.5 (and makes at card index time 14) resulting in all the afore-recited triggers switching to their "off" position, if they are not already in their "off" position. (Reference is made to the timing chart of Fig. 3A.) It will be apparent to those skilled in the art that it would not be necessary to repeatedly reset all of the above triggers each card cycle, but since some of them will require resetting when the machine is initially turned on so as to insure that they will be in their "off" position (and others require resetting each card cycle), it is found convenient to reset all of them each card cycle. Resetting of a trigger that is already in its "off" position will have no effect on the position of said trigger, and thus the resetting of certain triggers that do not necessarily require resetting every card cycle does not have any undesirable effect on the operation of the device, but does insure that all triggers are in their proper initial position, namely, the "off" position.

*A second embodiment of the invention as set forth in Figure 5 and related figures*

Figure 4:
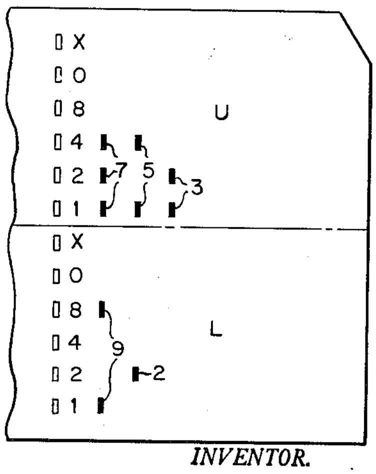
Fig. 4 shows a portion of a double-deck record card.

Before referring to Fig. 5, reference is made to Fig. 4 showing a portion of a double deck record card. The upper deck U and the lower deck L of the record card shown in part in Fig. 4 are identical. The double deck record card has a total of 12 card index positions per standard record card column and its over-all dimensions are the same as those of the standard record card shown in part in Fig. 2. Actually, the double deck record card may be considered as a standard record card having its 12 card index positions per column divided into two equal groups of 6. The standard record card of Fig. 2 has 80 columns and is capable of storing 80 digits of numeric information; whereas, the double deck record card of Fig. 4 has 80 columns in its upper deck and 80 columns in its lower deck (a total of 160 columns), and is capable of storing 160 digits of numeric information. On this basis, the record card of Fig. 4 will be referred to as an increased capacity record card.

Although in this embodiment we are only concerned with numeric information it will be apparent to those skilled in the art that the record cards of Figs. 2 and 4 may be used for alphabetic as well as numeric information by judicious choice of punched hole coding and that the ratio of increased capacity will remain the same, namely, 2 to 1 (i. e., 160 record columns to 80 record columns) for the type of cards shown in part in Figs. 4 and 2, respectively.

The upper and lower decks of the increased capacity card are identical. The six index card positions comprising the upper deck will be designated as XU, 0U, 8U, 4U, 2U and 1U: the six index positions comprising the lower deck will be designated as XL, 0L, 8L, 4L, 2L and 1L. The U and L are found convenient for purpose of explanation, and respectively refer to the upper and lower decks. One suitable code as to numeric information which is equally applicable to the upper and lower decks, found convenient for purpose of explanation, is as follows: digit 1 is represented by punched hole 1U or 1L; digit 2 is represented by punched hole 2U or 2L; digit 3 is represented by punched holes 2U and 1U or 2L and 1L; digit 4 is represented by punched hole 4U or 4L; digit 5 is represented by punched holes 4U and 1U or 4L and 1L; digit 6 is represented by punched holes 4U and 2U or 4L and 2L; digit 7 is represented by punched holes 4U, 2U and 1U or 4L, 2L and 1L; digit 8 is represented by punched hole 8U or 8L; digit 9 is represented by punched holes 8U and 1U or 8L and 1L. From the above code, it will be seen that each of the upper 80 columns and each of the lower 80 columns of an increased capacity card is capable of storing or recording any digit value from 1 through 9.

The circuit of Fig. 5 which accomplishes the reading to electronic storage means of the numeric information punched in the 160 columns of an increased capacity record card functions in much the same manner, with variations in timing and with a binary 8 counter in place of a decade counter, as the device disclosed in Fig. 3 for use with the standard record card.

In Figs. 3 and 5, components such as triggers, switches, etc., designated by like reference characters are the same and perform like functions in each figure but with a variation as to timing.

The pulse generator of the device shown in Fig. 5 may be said to include the following components and their associated circuitry: cam contacts P–9, P–20, P–21, P–22 and P–26; triggers T–1, T–31, T–44, T–45, T–46, T–47 and T–48; and switch S–5.

The pulse generator of Fig. 5 functions in the following manner, to deliver, 8, 4, 2 and 1 pulse (in bursts) at mechanically timed intervals synchronized with the movement of an increased capacity record card. A source of "A" pulses, which is actually a source of square wave pulses of approximately 50 (+25 to—25) volts magnitude at a frequency of substantially 55 kilocycles is impressed, via lead 20A, upon terminal 6 of switch S–5. Switch S–5 is a pentagrid tube switch whose circuit is shown in detail in Fig. 12. In order for switch S–5 to pass negative pulses (of inverted "A" pulse type) to the binary input terminals 6 and 3, of trigger T–44, trigger T–1 must previously have been turned "on" so that terminal 9 of switch S–5 may be conditioned by a more positive potential obtained via lead 21 from terminal 7 of trigger T–1. The circuit of trigger T–1 is shown in detail in Fig. 9.

Triggers T–46, T–47 and T–48 of Fig. 5 (enclosed within broken line 108) constitute a binary eight counter. That is, when only trigger T–46 is in its "on" position, a one count is stored in said counter; when only trigger T–47 is in its "on" position, a two count is stored in said counter. When only trigger T–48 is in its "on" position, a four count is stored in said counter. It follows that: when triggers T–46 and T–47 are "on," a three count is stored in said counter; when triggers T–46 and T–48 are "on," a five count is stored in said counter; when triggers T–47 and T–48 are "on," a six count is stored in said counter; and when triggers T–46, T–47 and T–48 are "on," a seven count is stored in said counter.

From the description to follow it will be seen that just prior to card index time 8U, a zero count will be stored in counter 108, i. e. triggers T–46, T–47 and T–48 all respectively in their "off" positions; that just prior to card index time 4U, a four count will be stored in counter 108, i. e. trigger T–48 switched to its "on" position; that a short time prior to card index time 2U, a six count will be stored in counter 108, i. e. triggers T–47 and T–48 switched to their respective "on" positions; and that just preceding card index time 1U, a seven count will be stored in counter 108, i. e. triggers T–46, T–47 and T–48 switched to their respective "on" positions. The above-recited sequence of counter settings is set forth with respect to the upper deck (U) of an increased capacity record card. However, the sequence as to the lower deck (L) is correspondingly identical.

*Card index time* 8U.—The pulse generator delivers 8 positive voltage pulses during card index time 8U as a result of the following sequence of operations. Lead 102 has a −100 volt potential impressed on it. The −100 volt potential from lead 102 is impressed, when cam contact P–26 is closed, as follows: through cam contact P–26, lead 104, and lead 104A to terminals 4, respectively, of triggers T–31, T–1, T–44 and T–45. The −100 volt potential from lead 102 is also impressed when cam contact P–24 is closed as follows: through cam contact P–24, lead 210, and lead 210A to terminals 4, respectively, of triggers T–46, T–47, T–48 and T–32. Cam contact P–24 opens at card index time X.6U to reset (switch "off") the aforerecited triggers. Cam contact P–26 opens at (increased capacity) card index time 0.5U and by removing the −100 volt potential applied to terminal 4 of each of the triggers T–31, T–1, T–44 and T–45, results in all said triggers switching to their respective "off" positions. The closing of cam contact P–26 at card index time 0.8U has no effect on the position of said triggers. Cam contact P–9 closes at card index time 8.1U and thereby effectively impresses a +40 volt potential on terminal 6 of trigger T–31, via the following circuit: lead 101 carrying a +40 volt potential, cam contact P–9, and lead 103 to terminal 6. As a result trigger T–31 switches to its "on" position. The reduced voltage appearing at terminal 8 of trigger T–31 when said trigger is switched to its "on" position, is transmitted, via lead 28, to terminal 3 of trigger T–1 and effects the switching of trigger T–1 to its "on" position. When trigger T–1 is in its "on" position the potential on terminal 7 of said trigger rises and is impressed via lead 21 on terminal 9 of switch S–5. The more positive potential impressed on terminal 9 of switch S–5 conditions said terminal (and switch) so that the "A" pulses appearing at terminal 6 of said switch result in corresponding negative pulses appearing at terminal 4 of said switch. The negative pulses appearing at terminal 4 of switch S–5 are impressed via lead 20 on binary connected input terminals 6 and 3 of trigger T–44. Trigger T–44 is connected via lead 22 to binary connected input terminals 6 and 3 of trigger T–45. Actually, triggers T–44 and T–45 constitute a four counter of negative voltage pulses. That is, for every four negative voltage pulses impressed on terminals 6 and 3 of trigger T–44 a single negative voltage pulse appears at terminal 8 and a single positive voltage pulse appears at terminal 7 of trigger T–45. (From Fig. 6 of the drawing it will be seen that the positive pulses appearing at terminal 7 of trigger T–45, result from said trigger switching to its "on" position, whereas, the negative pulses appearing at terminal 8 of said trigger result from said trigger switching to its "off" position.) It is to be noted that every positive pulse appearing at terminal 7 of trigger T–45 leads in time (i. e., phase advanced) its corresponding negative pulse appearing at terminal 8 of trigger T–45. The negative pulses appearing at terminal 8 of trigger T–45 are impressed via lead 23 on binary connected input terminals 6 and 3 of trigger T–46, i. e., the input terminals of eight counter 108. Since triggers T–46, T–47 and T–48 are in their respective "off" positions, it will require 8 negative voltage pulses, applied to the input of counter 108, before a negative voltage output pulse will appear at terminal 8 of trigger T–48, i. e. the output of counter 108. The negative voltage output pulse of counter 108 (terminal 8 of trigger T–48) is applied via lead 24 to terminal 6 of trigger T–1, resulting in said trigger switching to its "off" position. When trigger T–1 is switched to its "off" position as a result of the negative output pulse from counter 108, the potential at terminal 7 of said trigger is decreased. The reduced potential from terminal 7 of trigger T–1 is transmitted via lead 21 to terminal 9 of switch S–5 and results in deconditioning said terminal of said switch, i. e., turning off or rendering non-conductive switch S–5. With switch S–5 non-conductive, no further negative pulses appear at terminal 4 of said switch nor positive pulses at terminal 7 of trigger T–45. It will be recalled that 8 negative pulses appeared at terminal 8 of trigger T–45 during card index time 8U. Thus it is apparent that at the output terminal of the pulse generator, namely, terminal 7 of trigger T–45, 8 positive voltage pulses appeared during card index time 8U.

*Card index time* 4U.—The following sequence of operation results in the delivery of 4 positive voltage pulses by the pulse generator during card index time 4U: Cam contact P–26 opens at card index time 8.5U resulting in triggers T–31, T–1, T–44, and T–45 switching to their respective "off" positions. From Fig. 5, it will be observed that terminal 5 of trigger TO48 is connected through lead 109, cam contact P–20, lead 108–A, cam contact P–22, lead 106, and cam contact P–21, to minus 100 volt lead 102. At card index time 8.6U, cam contact P–20 opens and as a result of removing the minus 100 volt potential from terminal 5 of trigger T–48 the switching of said trigger to its "on" position is effected. It is to be noted that with trigger T–48 in its "on" position, counter 108 has the digit 4 stored in it; and since it is an 8 counter, after 4 negative input pulses all of its triggers will be set to 0 and a negative output pulse will have appeared at terminal 8 of trigger T–48 as a result of said trigger switching to its "off" position. At card index time 4.1U cam contact P–9 closes and thereby results in a 40 volt positive potential being impressed on terminal 6 of trigger T–31, resulting in said trigger switching to its "on" position. When trigger T–31 is switched "on," the potential at its terminal 8 is reduced and this reduced potential through the medium of lead 28 is effective in reducing the potential impressed on terminal 3 of trigger T–1, causing trigger T–1 to switch to its "on" position. As will be recalled, when trigger T–1 is in its "on" position, terminal 9 of switch S–5 is conditioned by a more positive potential being impressed thereon. When terminal 9 of switch S–5 is conditioned, the "A" pulses impressed on terminal 6 of said switch result in negative voltage pulses appearing at terminal 4 of said switch. From the discussion with regard to card index time 8U, it will be recalled that for every four negative pulses appearing at terminal 4 of switch S–5 a negative voltage pulse appears at terminal 8 and a positive voltage pulse appears at terminal 7 of trigger T–45. The negative voltage pulses appearing at terminal 8 of trigger T–45 are transmitted via lead 23 to input terminals 6 and 3 (trigger T–46) of counter 108. Since counter 108 has a 4 count stored in it, the fourth negative voltage input pulse it receives will result in all 3 of its triggers switching to their respective "off" positions and a negative voltage pulse from terminal 8 of trigger T–48 being transmitted via lead 24 to terminal 6 of trigger T–1; resulting in trigger T–1 switching to its "off" position. When trigger T–1 is in its "off" position, terminal 9 of switch S–5 is deconditioned and as a result it it may be said that switch S–5 is turned "off," i. e., will not respond to the "A" pulses impressed upon its terminal 6. From the above discussion, it is seen that 4 positive voltage pulses appear at terminal 7 of trigger T–45, namely, the output terminal of the pulse generator, during card index time 4U.

*Card index time* 2U.—The delivery of 2 positive voltage pulses during card index time 2U is accomplished by the pulse generator as a result of the following sequence of operation: Cam contact P–26 opens at card index time 4.5U causing triggers T–31, T–1, T–44, and T–45 to respectively switch to their "off" positions. From Fig. 5 it will be seen that terminal 5 of trigger T–47 is connected via lead 107, cam contact P–22, lead 106, and cam contact P–21 to minus 100 volt potential lead 102. The opening of cam contact P–22 at card index time 4.6U will remove the minus 100 volt potential from terminals 5 of triggers T–47, and T–48, resulting in said triggers switching to their respective "on" positions. When triggers T–47 and T–48 are in their respective "on" positions, counter 108 has the digit 6 stored in it; that is, 2 negative input pulses to said counter will result in a negative output pulse from terminal 8 of trigger T–48 and the switching of all three triggers of said counter to their respective "off" positions. At card index time 2.1U, cam contact P–9 closes and results in trigger T–31 being switched "on." The switching "on" of trigger T–31 causes trigger T–1 to switch "on" resulting in terminal 9 of switch S–5 being conditioned. The conditioning of terminal 9 of switch S–5 results in the "A" pulses impressed on terminal 6 of said switch producing negative voltage pulses at terminal 4 of said switch. The negative voltage pulses from switch S–5 are impressed via lead 20 on terminals 6 and 3 of trigger T–44, and for every four negative voltage pulses appearing at terminal 4 of switch S–5 a positive voltage pulse appears at terminal 7 and a negative voltage pulse appears at terminal 8 of trigger T–45. The negative voltage pulses appearing at terminal 8 of trigger T–45 serve, via lead 23, as the input pulses to counter 108. Since counter 108 has a 6 count stored in it, it will be reset to 0 (all its triggers in their respective "off" positions) after 2 negative input pulses. Further, as trigger T–48 of counter 108 is switching to its "off" position as a result of the second negative voltage input pulse, a negative voltage pulse will appear at terminal 8 of trigger T–48 and be transmitted via lead 24 to terminal 6 of trigger T–1, causing the trigger T–1 to switch to its "off" position. The switching of trigger T–1 to its "off" position will decondition terminal 9 of switch S–5 that is, render said switch non-conductive. At terminal 7 of trigger T–45, 2 positive voltage pulses appeared during card index time 2U.

*Card index time* 1U.—During card index time 1U, a single positive voltage pulse will appear at terminal 7 of trigger T–45, namely, the output terminal of the pulse generator. This is accomplished by the following sequence: cam contact P–26 breaks at card index time 2.5U, resulting in triggers T–31, T–1, T–44, and T–45 switching to their respective "off" positions. From Fig. 5 it will be seen that terminal 5 of trigger T–46 is connected via lead 105, cam contact P–21, to minus 100 volt potential lead 102. It will be seen that the opening of cam contact P–21 at card index time 2.6U will effectively remove the minus 100 volt potential from terminals 5 of triggers T–46, T–47, and T–48, resulting in all 3 of said triggers switching to their respective "on" positions. With triggers T–46, T–47, and T–48 in their respective "on" positions, counter 108 has a 7 count stored in it. Thus, the first negative input pulse to counter 108 will result in a negative output pulse from counter 8 as well as the switching of all 3 triggers of counter 8 to their respective "off" positions. At card index time 1.1U, cam contact P–9 closes, resulting in trigger T–31 switching to its "on" position. The switching "on" of trigger T–31 causes trigger T–1 to switch to its "on" position. When trigger T–1 is "on," terminal 9 of switch S–5 is conditioned so that the "A" pulses impressed on terminal 6 of switch S–5 result in negative voltage pulses appearing at terminal 4 of said switch. Now it will be recalled that for every four negative voltage pulses appearing at terminal 4 of switch S–5 a negative voltage pulse appears at terminal 8 and a positive voltage pulse appears at terminal 7 of trigger T–45. Since counter 108 has a 7 count stored in it, the first negative voltage pulse appearing at terminal 8 of trigger T–45 will result (since it is fed to the input terminals of counter 108) in counter 108 passing a negative voltage output pulse from terminal 8 of trigger T–48 via lead 24 to terminal 6 of trigger T–1, causing trigger T–1 to switch to its "off" position. When trigger T–1 is switched "off," terminal 9 of switch S–5 is deconditioned, and as a result switch S–5 will not respond to the "A" pulses impressed upon its terminal 6. One positive voltage pulse appeared at terminal 7 of trigger T–45 during card index time 1U.

Figure 5A:
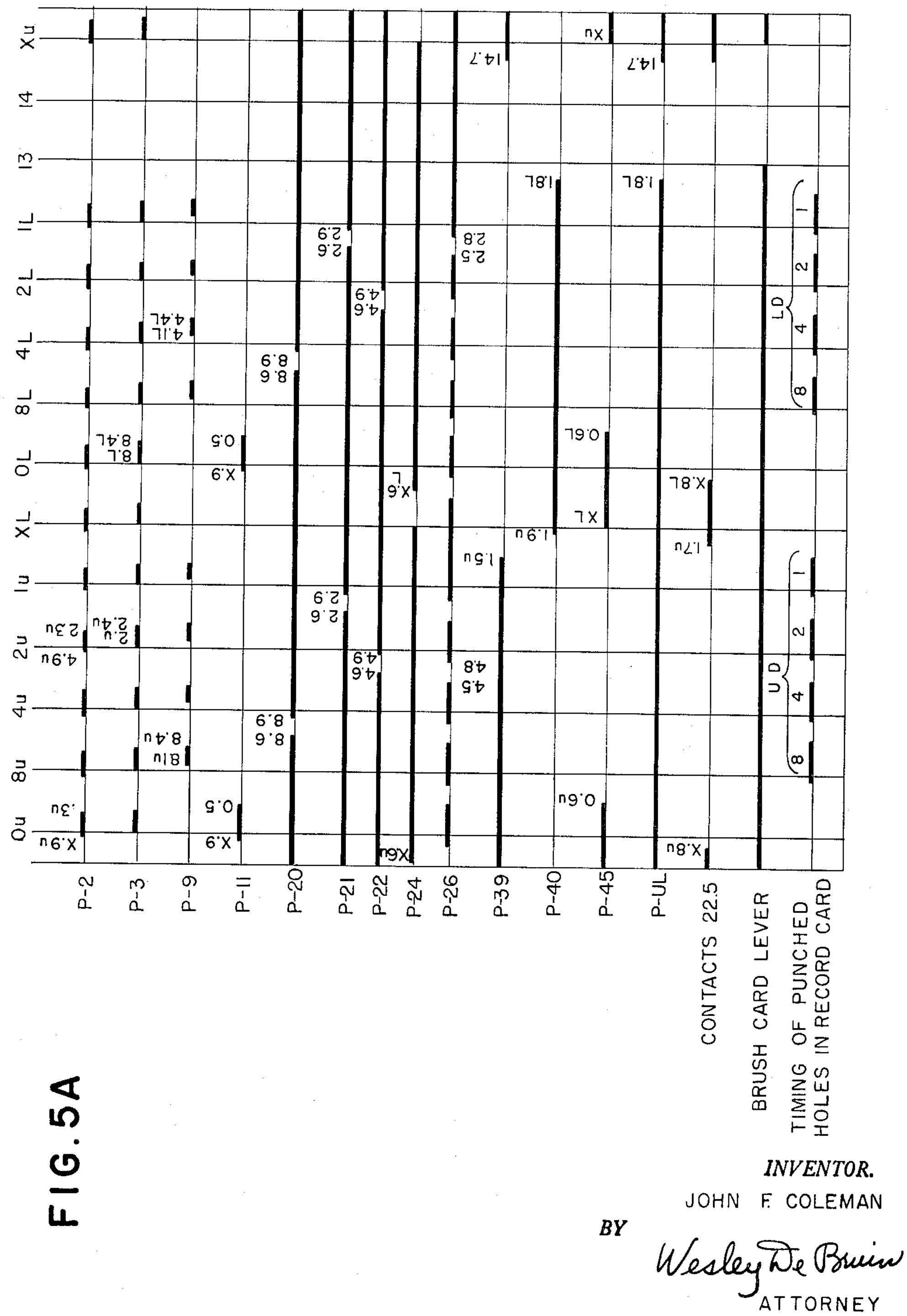
Fig. 5A is a timing chart for the cam contacts, relay contacts, etc. shown in Fig. 5.

The sequence of operation set out above discloses how the pulse generator accomplishes the delivery of 8 positive pulses during card time 8U, 4 positive pulses during card index time 4U, 2 positive pulses during card index time 2U, and 1 positive pulse during card index time 1U. The pulse generator operates in similar manner with respect to card index times 8L, 4L, 2L, and 1L. Reference is made to the timing chart shown in Fig. 5A of the drawing. In Fig. 5A, the axis of abscissas is used to set forth graphically card index times XU, 0U, 8U, 4U, 2U, 1U, XL, 0L, 8L, 4L, 2L, 1L, as well as machine index times 13 and 14. The timing chart shown in Fig. 5A is for a 14 cycle point machine. The circuit of Fig. 5 is described as being embodied in a 14 cycle point machine but from the following discussion as well as the preceding discussion it will be apparent that with a modification of the timing (shown in Fig. 5A) the circuit may be used in a machine other than the 14 cycle point type herein disclosed.

With the device shown in Fig. 5 a few general observations are in order. The breaking of cam contact P–26 results in the switching of triggers T–31, T–1, T–44, and T–45 to their respective "off" positions. The closing of cam contact P–26 has no effect on the respective positions of the aforementioned triggers. It would not be necessary to reset the triggers T–46, T–47, and T–48 as often as is done, i. e., triggers T–46, T–47, and T–48, constitute the 8 counter 108 and would actually only have to be set to their "off" position when the machine is initially turned on. However, resetting them through the medium of cam contact P25 (which occurs at card index times X.6U and X.6L) is convenient and does not interfere with the normal operation of the pulse counter. The opening of cam contact P–21 switches triggers T–46, T–47, and T–48 to their respective "on" positions: the closing of cam contact P–21 has no effect on the position of said triggers. The opening of cam contact P–22 switches triggers T–47 and T–48 to their respective "on" positions: the closing of cam contact P–22 has no effect on the position of said triggers. The opening of cam contact P–20 causes trigger T–48 to switch to its "on" position; the closing of cam contact P–20 has no effect on the position of trigger T–48. The closing of cam contact P–9 results in trigger T–31 switching to its "on" position: the opening of cam contact P–9 has no effect on the position of trigger T–31. The switching "on" of trigger T–31 results in trigger T-1 switching "on." When trigger T-1 is in its "on" position, terminal 9 of switch S-5 is so conditioned that the "A" pulses impressed on terminal 6 of said switch result in negative pulses at terminal 4 of said switch. Triggers T-44 and T-45 constitute a 4 counter of negative voltage pulses, that is, for every four negative input pulses (from terminal 4 of switch S-5) to said counter a negative output pulse appears at terminal 8 and a positive output pulse appears at terminal 7 of trigger T-45.

It is to be kept in mind that the positive pulse appearing at terminal 7 of trigger T-45 results from said trigger switching to its "on" position; that the negative pulse appearing at terminal 8 of trigger T-45 results from said trigger switching to its "off" position. Thus it is seen that every positive pulse appearing at terminal 7 of trigger T-45 is phase advanced (leads in time) with respect to its corresponding negative output pulse appearing at terminal 8 of trigger T-45.

The above statements are true and consistent for the pulse generator of Fig. 5 throughout its entire cycle of operation, that is, upper and lower decks respectively. Referring to Fig. 5A, the timing of the various cam contacts, brush lever contacts, and relay contacts, is given.

The positive output pulses from the pulse generator (terminal 7 of trigger T-45) are impressed via lead 33 on terminal 5 of cathode follower C-21, and result in positive pulses appearing at terminal 3 of C-21 which are impressed via lead 34 on terminal 5 of inverter switch I-13. Each positive pulse impressed on terminal 5 of switch I-13 results in a negative pulse being transmitted from terminal 7, of said switch, via lead 35, to terminal 3 of "negative and" switch I-5. That is, for every positive output pulse from the pulse generator a corresponding negative pulse is impressed on terminal 3 of switch I-5. Thus, it will be seen that at approximately card index time 8.1U, 8 negative pulses will be sequentially impressed on terminal 3 of "negative and" switch I-5; at approximately card index time 4.1U, 4 negative pulses will be sequentially impressed on terminal 3 of switch I-5; at approximately card index time 2.1U, 2 negative pulses will be sequentially impressed on terminal 3 of switch I-5; and at approximately card index time 1.1U, 1 negative pulse will be impressed upon terminal 3 of switch I-5. A corresponding sequence of operation takes place with regard to the lower deck of the increased capacity record card.

Assuming for purpose of explanation that it is desired to read to storage the numerical data punched in the upper deck or lower deck of an increased capacity record card, then it is necessary that master trigger T-32 be in its "on" position. The switching of trigger T-32 to its "on" position is accomplished by the following circuitry: From the timing chart, Fig. 5A, it will be seen that cam contact P-39 is closed from index time 14.7 through card index time 1.5U. It will also be seen that relay contacts 22.5 are closed from card index time 14.7 through card index time X.8U. The closing of relay contacts 22.5 from card index time 14.7 through card index timer X.8U is accomplished by energizing relay coil 22.5, not shown. Now referring to Fig. 5 it will be seen that as a result of the timely closing of cam contact P-39 and relay contacts 22.5 a circuit is completed as follows: positive 40 volt potential, lead 101, cam contact P-39, lead 110, plug hub 110A, control panel wire 111, plug hub 112A, lead 112, relay contacts 22.5, relay pick coil 143-P, lead 113, to ground, i. e., other side of 40 volt source. Hence, it will be seen that relay coil 143-P is energized from approximately card index time 14.7 through card index time X.8U (reference is made to the timing chart of Fig. 5A). Now again referring to Fig. 5A, it will be seen that cam contact P-45 is closed from card index time XU through card index time 0.6U. This will complete a circuit from the positive 40 volt source through lead 101, cam contact P-45, lead 114, relay contacts 143A, relay hold coil 143H, and lead 115 to ground. Thus, relay coil 143H will be energized from card index time XU through 0.6U. Referring again to Fig. 5A, it will be seen that cam contact P-11 is closed from card index time X.9U through card index time 0.5U and that by the circuit set forth above relay contacts 143B are closed during this interval of card index time. Thus, it will be seen that at approximately card index time X.9U a circuit is completed as follows: positive 40 volt potential, lead 101, cam contact P-11, lead 116, relay contacts 143B, and lead 117 to terminal 6 of trigger T-32. This effectively impresses a 40 volt potential on terminal 6 of trigger T-32, resulting in said trigger switching to its "on" position.

Figures 11, 12, 13, 14, 15:
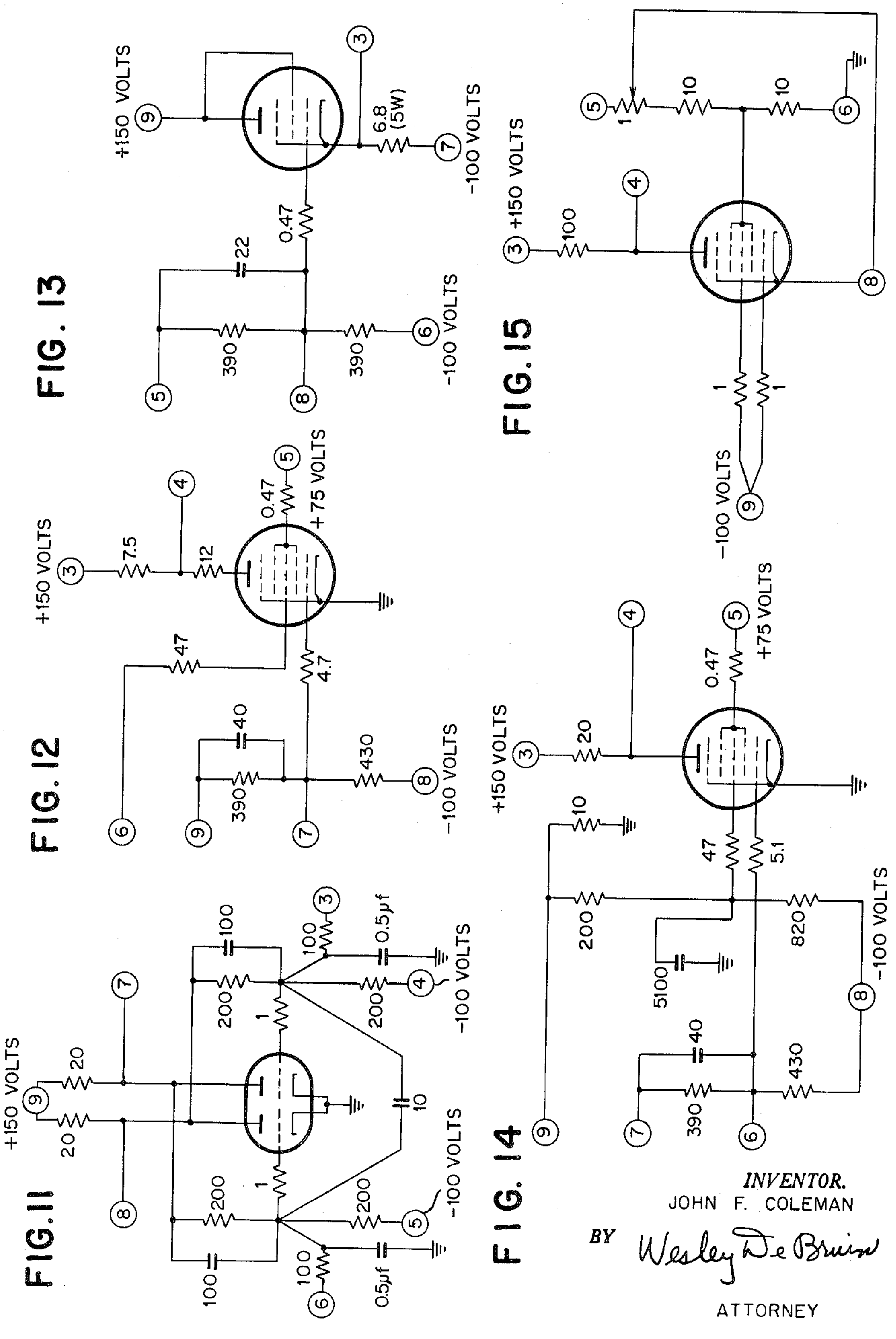
Fig. 11 is a detailed circuit diagram of a particular trigger represented by block T–32 in Figs. 3 and 5, respectively.
Fig. 12 is a detailed circuit diagram of a particular electronic switch represented by block S–5 in Figs. 3 and 5, respectively.
Fig. 13 is a detailed circuit diagram of a particular cathode-follower circuit represented by block C–21 in Figs. 3 and 5, respectively.
Fig. 14 is a detailed circuit diagram of a particular electronic switch represented by block S–32 in Figs. 3 and 5, respectively, and also by block S–32A in Fig. 5.
Fig. 15 is a detailed circuit diagram of a particular electronic switch represented by block S–41 in Figs. 3 and 5, respectively.
Figure 18:
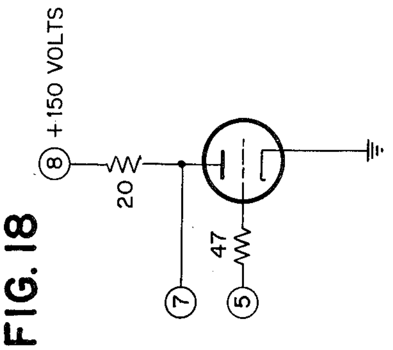
Fig. 18 is a detained circuit diagram of a particular electronic switch which may be referred to as an inverter and is represented by block I–13 in Figs. 3 and 5, respectively.

With trigger T-32, the master trigger, in its "on" position, the potential at terminal 8 of said trigger is reduced and this reduced potential is impressed via lead 41 on terminal 5 of "negative and" switch I-5; resulting in said terminal of said switch being conditioned. With terminal 5 of switch I-5 conditioned by a less positive voltage, the negative pulses impressed on terminal 3 of said switch will result in positive pulses being impressed via lead 36 on terminal 7 of switch S-32A. As will be recalled (refer to Fig. 14) terminals 6 and 7 of switch S-32A are connected through an impedance network consisting of a resistor in parallel with a capacitor, so that a negative voltage pulse appearing at terminal 7 also appears at terminal 6 but of lesser magnitude. Further, it will be seen that leads 36B, 36C, 36D and 36E effect the connecting in common of terminals 6 of the following switches: S-32A, S-335, S-336, S-337 and S-338. All of the aforementioned switches utilize pentagrid tubes in a circuit such that two terminals of said circuit must be conditioned by a positive voltage of proper magnitude in order to render the switch conductive. Reference is made to Figs. 14 and 21 of the drawing.

Referring to Fig. 5 it will be seen that transfer contacts 150A, 150B, 150C, 150D, 150E, 150F, 150G and 150H are ganged and are normally in the left hand position for the duration of the reading of the upper deck, namely, card index times XU through 1U. The circuit for energizing relay coil 150 which will transfer all the aforementioned transfer contacts to their right hand contact (as viewed in Fig. 5) is not shown. Referring to Fig. 5A, it will be seen that a circuit is made through cam contacts P-2 and P-3 for the following increased capacity card index time intervals: 0U, through .3U, 8U through 8.3U, 4U through 4.3U, 2U through 2.3U, 1U through 1.3U, XL through X.3L, 0L through .3L, 8L through 8.3L, 4L through 4.3L, 2L through 2.3L, 1L through 1.3L, and XU through X.3U. Brush lever contacts 43D, 43E, and 43F, will be closed when a record card is in position under read brushes 47 through 54. All timing is with respect to the position of an increased capacity record card under the read brushes. For example, at card index time 8U, card index position 8 of the upper deck of the increased capacity record card is under the read brushes. Referring to Fig. 5, it will be seen that read brushes 47 through 54 are respectively positioned to read columns 71-I through 78-I of the upper deck of an increased capacity record card. It will further be seen that read brush 48 is connected through transfer contact 150B, through plug hub 153, control panel wire 171, plug hub 55A and lead 55 to terminal 9 of switch S-32A; that read brush 50 is connected through transfer contact 150D, plug hub 157, control panel wire 172, plug hub 56A, and lead 56 to terminal 9 of switch S-335; that read brush 52 is connected through transfer contact 150F, plug hub 161, control panel wire 173, plug hub 57A and lead 57 to terminal 9 of switch S-336; that read brush 53 is connected through transfer contact 150G, plug hub 163, control panel wire 174 and plug hub 58A, lead 58 to terminal 9 of switch S-337; and that read brush 54 is connected through transfer contact 150H, plug hub 165, control panel wire 175, plug hub 59A and lead 59 to terminal 9 of switch S-338.

In Figure 5 it will be seen that increased capacity record card IC has the following columns, namely 71–I through 78–I, respectively disposed under read brushes 47 through 54.

For purpose of explanation, let us assume that card column 72–I has a 6 digit recorded in it, namely, the 4 and 2 positions punched; that card column 74–I has a 3 digit recorded in it, namely, the 2 and 1 positions punched; that card column 76–I has the digit 4 recorded in it, namely, the 4 position punched; that card column 77–I has the digit 5 recorded in it, namely, positions 4 and 1 punched; and that card column 78–I has the digit 8 recorded in it, namely, the position 8 punched. Now recalling that trigger T–32 was switched to its "on" position at approximately card index time X.9U and that this resulted in the conditioning of terminal 5 of "negative and" switch I–5, it will be seen that positive pulses appear at the respective terminals 6 of switches S–32A, S–335, S–336, S–337 and S–338 as follows: 8 positive pulses at approximately card index time 8.1U; 4 positive pulses at approximately card index time 4.1U; 2 positive pulses at approximately card index time 2.1U; and 1 positive pulse at approximately card index time 1.1U. An increased capacity record card designated by reference character IC is shown in Fig. 5 positioned between the contact roll 46 and read brushes 47 through 54. The increased capacity record card IC of Fig. 5 is passing between the read brushes and the contact roll upper deck first (edge XU leading) so that the direction of travel of the said card is perpendicular to and out of the paper as viewed in Fig. 5. Let us assume at this point that card index positions XU and 0U have passed the read brushes and that said brushes are reading card index position 8U. Now recalling that an 8 hole is punched in card column 78–I, it will be apparent that read brush 54 is making contact with contact roll 46. As a result of read brush 54 making contact during card index time 8U with contact roll 46, a circuit is completed as follows: positive 40 volt potential, lead 101, cam contacts P–2 and P–3, brush lever contacts 43D, 43E, and 43F, lead 44, plug hub 44A, contact brush 45, contact roll 46, read brush 54, transfer contact 150H, plug hub 165, control panel wire 175, plug hub 59A and lead 59 to terminal 9 of switch S–338. This so conditions terminal 9 of switch S–338 during card index time 8U that the 8 positive pulses impressed on terminal 6 of said switch (at approximately card index time 8.1U) result in 8 negative pulses from terminal 4 of said switch being transmitted via lead 64 to terminal 1 of factor storage unit FS–5. Thus, the punched "8" hole in increased capacity record card column 78–I results in the digit 8 being stored in factor storage unit FS–5.

The increased capacity record card IC will next have its card index position 4U disposed between the contact roll 46 and read brushes 47 through 54. At card index time 4U three columns, namely, 72–I, 76–I and 77–I will have their punched "4" hole read by read brushes 48, 52 and 53, respectively, resulting in 3 circuits from the positive 40 volt potential to the respective 9 terminals of switches S–32A, S–336 and S–337 being completed. The common portion of the 3 circuits completed is as follows: positive 40 volt potential, lead 101, cam contact P–2, cam contact P–3, brush lever contacts 43D, 43E and 43F, lead 44, plug hub 44A, contact brush 45, and contact roll 46. The remaining three legs of the 3 completed circuits are as follows: contact roll 46, read brush 48, transfer contact 150B, plug hub 153, control panel wire 171, plug hub 55A, and lead 55 to terminal 9 of switch S–32A; contact roll 46, read brush 52, transfer contact 150F, plug hub 161, control panel wire 173, plug hub 57A, and lead 57 to terminal 9 of switch S–336; and contact roll 46, read brush 53, transfer contact 150G, plug hub 163, control panel wire 174, plug hub 58A and lead 58 to terminal 9 of switch S–337. The afore-recited completed circuits effect the conditioning of terminal 9 of switches S–32A, S–336 and S–337, respectively, so that the 4 positive pulses impressed on terminals 6 of each of said switches results in 4 negative pulses from terminal 4 of each switch being fed through leads 60, 62, and 63, respectively, to factor storage units FS–1, FS–3, and FS–4, respectively. To sum it up, the punched "4" hole in card column 72–I results in the 4 digit being stored in FS–1. The punched 4 hole in card column 76–I results in the digit 4 being stored in factor storage unit FS–3. The punched 4 hole in card column 77–I results in the digit 4 being stored in factor storage unit FS–4.

Now at card index time 2U, read brushes 47 through 54 will be reading card position 2 of the upper deck (i. e., 2U) of record card IC and read brushes 48 and 50 will make contact with contact roll 46 due to the punched holes in the "2" position of card columns 72–I and 74–I. The 2 circuits completed during card index time 2U are as follows: positive 40 volt potential, lead 101, cam contacts P–2 and P–3, brush lever contacts 43D, 43E, and 43F, lead 44, plug hub 44A, contact brush 45, contact roll 46, read brush 48, transfer contact 150B, plug hub 153, control panel wire 171, plug hub 55A, and lead 55 to terminal 9 of switch S–32A; positive 40 volt potential, lead 101, cam contacts P–2 and P–3, brush lever contacts 43D, 43E, 43F, lead 44, plug hub 44A, contact brush 45, contact roll 46, read brush 50, transfer contact 150D, plug hub 157, control panel wire 172, plug hub 56A, and lead 56 to terminal 9 of switch S–335. As a result of terminal 9 of switches S–32A, and S–335, respectively, being conditioned by a positive 40 volt potential during card index time 2U, the 2 positive pulses impressed on terminals 6 of said switches at approximately 2.1 card index time will result in 2 negative pulses through leads 60 and 61, respectively, being fed to factor storage units FS–1 and FS–2. Since factor storage unit FS–1 already had the digit 4 stored in it the additional 2 pulses will result in the factor 6 being stored in factor storage unit FS–1. The 2 pulses impressed upon input terminal 1 of factor storage unit FS–2 will result in the digit 2 being stored therein.

At card index time 1U, the 1 position of the upper deck of record card IC is being read by read brushes 47 through 54. Since card columns 74–I and 77–I each have a punched hole in their 1 position of the upper deck a circuit will be completed such that during card index time 1U a positive 40 volt potential will be impressed on terminals 9 of switches S–335 and S–337, respectively. (The circuits will be the same as were set out in detail for the reading of the punched "2" hole in card column 74–I and the punched 4 hole in card column 77–I.) The 40 volt potential impressed on terminal 9 of switches S–335 and S–337 so conditions said switches that the single positive pulse appearing on terminals 6, respectively, of said switches results in a single negative pulse being impressed via lead 61 on input terminal 1 of factor storage unit FS–2 and a single negative pulse being impressed via lead 63 on input terminal 1 of factor storage unit FS–4. Since factor storage unit FS–2 already had a 2 count stored in it, this additional negative pulse will result in a 3 count being stored in it. Since factor storage unit FS–4 already had a 4 count stored in it, this additional negative pulse will result in a 5 count being stored in it.

Now it will be apparent that when the upper deck has been read, factor storage units FS–1, FS–2, FS–3, FS–4, and FS–5 will respectively have the following digits stored in them: 6, 3, 4, 5, and 8. It will be noted that read brushes 49 and 51 were not effectively connected and thus any information punched in card column 73–I and 75–I would not be read to storage. It is to be pointed out that factor storage units FS–1 through FS–5 could be reset prior to the reading of the lower deck and thus they could be used in conjunction with (i. e., to store the numeric information) the lower as well as the upper deck. However, if it is desired, relay 150 can be energized and transfer contacts 150A through 150H transferred to the right and then by proper connections to additional factor storage units (not shown) a separate bank of storage units may be used with the lower deck and hence it would not be necessary to reset factor storage units FS–1 through FS–5 prior to the reading of the lower deck.

Factor storage units FS–1, FS–2, FS–3, FS–4 and FS–5, in Figs. 3 and 5 are identical and any unit that could be used with the circuit of Fig. 3 can also be used with the circuit of Fig. 5.

The sign storage means for the device shown in Fig. 5 will now be discussed. By sign storage means is meant the means by which the device stores the fact that the quantity entered in certain factor storage units is negative. In the preceding discussion, it has been shown how the number 63,458 is read from a record card into the storage units. Now for purpose of explanation, let us assume that this number is a negative quantity. Since this number is a negative quantity, there will be a punched hole in card column 71–I of increased capacity record card IC. Let us assume that the 0 position of card column 71–I is punched to designate the negative quantity punched in card columns 72–I, 74–I, 76–I, 77–I and 79–I. Then when the 0U position of card column 71–I is read, a circuit will be completed as follows: plus 40 volt potential, lead 101, cam contacts P–2 and P–3, brush card lever contacts 43D, 43F and 43E, lead 44, plug hub 44A, contact brush 45, contact roll 46, read brush 47, transfer contact 150A, plug hub 151, control panel wire 175, plug hub 176A, and lead 176 to terminal 9 of switch S–32. Terminal 7 of switch S–32 was conditioned at approximately card index time X.9U by the switching "on" of trigger T–32. Therefore, the plus 40 volt potential impressed on terminal 9 of switch S–32 will render said switch conductive and reduce the potential at terminal 4 of said switch. The reduced potential at terminal 4 of switch S–32 is impressed via lead 67 on terminal 8 of trigger T–2, resulting in trigger T–2 switching to its "on" position as a result of what is known in the art as "plate pull-over." Sign storage trigger T–2 is now in its "on" position to designate or store the fact that the quantity read into factor storage units FS–1 through FS–5 is a negative quantity.

Figure 16:
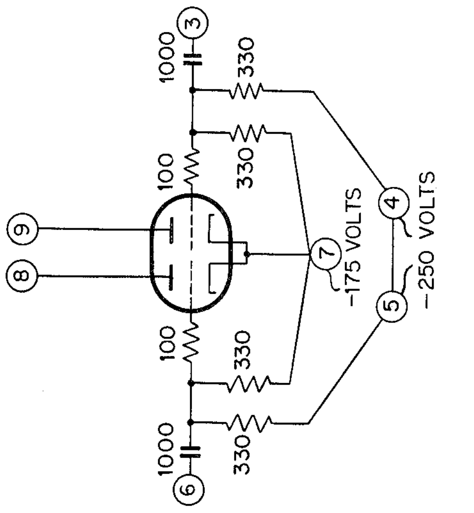
Fig. 16 is a detailed circuit diagram of a particular electronic switch, which may be referred to as an inverter switch, and is also known in the art as a "positive or" switch. The switch shown in Fig. 16 is represented by block I–28 in Figs. 3 and 5, respectively.

A detailed description of the "electronic reset means" will now be set forth. When trigger T–32 was switched "on" at approximately card index time X.9U the potential at terminal 7 of said trigger was increased and this increase in potential via leads 66 and 68 was impressed on terminal 6 of "positive or" switch I–28. A detailed circuit of switch I–28 is shown in Fig. 16. Switch I–28 consists of a pair of triodes so inter-connected that a positive potential of proper magnitude impressed on either terminal 6 or 3 of said switch will result in the potential on lead 69 being reduced. When the potential on lead 69 is reduced, this reduction in potential is transmitted via lead 70 to terminal 7 of power unit P–1. It is to be noted that lead 69 is connected to terminal 4 of switch S–41 and that terminal 5 of switch S–41 is connected via lead 70A to terminal X of power unit P–1. (A detailed circuit diagram of switch S–41 and power unit P–1 are respectively shown in Figs. 5 and 19 of the drawing.) When trigger T–32, the master trigger, is switched "on," the potential on terminal 6 of switch I–28 is increased to such an extent that the potential on lead 69 is reduced for a very short interval of time. The reduction in potential on lead 69 results in the potential on lead 71 connected to terminal 3 of power unit P–1 rising from minus 100 volts to approximately 0 for a short interval of time. Lead 71 is connected to the reset terminals of factor storage units FS–1, FS–2, FS–3, FS–4, and FS–5. Lead 71A is connected from lead 71 to terminal 4 of trigger T–2. Thus it will be seen that the switching "on" of trigger T–32 effectively resets the sign storage trigger and the factor storage units. If it is desired to reset the sign storage trigger and the factor storage units at an earlier time, a positive potential impressed on terminal 3 of switch I–28 will accomplish electronic reset. In Fig. 5, lead 68A is shown connected to terminal 3 of switch I–28 for this purpose.

With the exception of timing, i. e., card index time, the master trigger, the electronic reset means (namely, switch I–28, switch S–41, and power unit P–1) and the sign storage means (namely, switch S–32 and trigger T–2) function in Fig. 5 in almost identical manner as in Fig. 3.

Referring to Fig. 5, it will be seen that cam contacts P–UL are connected between lead 101 and through lead 180 to plug hubs 110B. If it were desired to read to storage the numeric information stored in both the upper and lower decks of an increased capacity card, then control panel wire 111 would be connected between plug hubs 110B and 112A instead of between plug hubs 110A and 112A. The timing for cam contacts P–UL is shown in Fig. 5A and the overall operation as to the upper deck is essentially as set forth in the preceding description. The operation with regard to the lower deck is in essence a repetition of the sequence of events which took place with regard to the upper deck. Hence, no detailed discussion will be undertaken.

From Fig. 5A it will be seen that plug hubs 110C are connected through lead 181, cam contact P–40, to lead 101. If it had been desired to read to storage only the information punched in the lower deck of an increased capacity record card, then control panel wire 111 would have been connected between plug hubs 112A, and 110C instead of between 112A and 110A. As stated earlier, the cycle of operation with respect to the lower deck is in essence a repetition of the cycle of operation with respect to the upper deck, which has been set out in detail earlier.

In the embodiment shown in Fig. 5, only 5 card columns are read to storage units. However, from the preceding discussion, it will be apparent that as many as 80 card columns or even 160 or more card columns may be read to storage. It will be apparent that the device of Fig. 5 could be adapted to a record card having 3 or more decks and that a plurality of independent sign storage means could be used.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A read-in circuit for use with a record controlled accounting machine comprising: an electronic pulse generator including a source of pulses, an electronic pulse counter, means for entering predetermined counts in said counter at correspondingly predetermined machine times, a gating trigger operable to an "on" and "off" condition, a second trigger for turning the gating trigger "on," said gating trigger being turned "off" by said pulse counter, and a first electronic switch means controlled by said gating trigger; a master trigger, means for controlling said master trigger, and second electronic switch means controlled by said master trigger, and means connecting said gating trigger to said second electronic switch means; electronic reset means including an electronic reset switch coupled to said master trigger, and amplifier means coupled to said reset switch; record reading means and third electronic switch means coupled to and jointly controlled by said second electronic switch means and said record reading means; and factor storage means coupled to said third electronic switch means, said electronic reset means adapted to reset said factor storage means.

2. A read-in circuit for use with a record controlled accounting machine comprising: a pulse generator including a source of pulses, a pulse counter, a gating trigger operable to an "on" and "off" condition, a second trigger for turning the gating trigger "on," said gating trigger being turned "off" by said pulse counter, and first electronic switch means controlled by said gating trigger; a master electronic trigger, second electronic switch means controlled by said master trigger, and connecting means connecting said first electronic switch means to said second electronic switch means; sign storage means; electronic reset means; record reading means connected to said sign storage means; third electronic switch means jointly controlled by said second electronic switch means and said record reading means; and factor storage means coupled to said third electronic switch means, said electronic reset means adapted to reset said sign storage means and said factor storage means.

3. A read-in circuit as claimed in claim 2, wherein the sign storage means includes a sign storage trigger, an electronic switch, and means coupling said switch, respectively, to said master trigger, said sign storage trigger and said record reading means.

4. A read-in circuit as claimed in claim 2 wherein the electronic reset means includes a "positive or" switch, a power switch, a power unit, and means interconnecting said "positive or" switch with said master trigger and, respectively, with said power switch and said power unit.

5. A read-in circuit as claimed in claim 2 wherein the pulse counter is a decade counter having an input and an output terminal, and including four electronic triggers, said output terminal of said counter is connected to said gating trigger.

6. A read-in circuit as claimed in claim 2 wherein the pulse counter is an eight counter consisting of three binary connected triggers, said connecting means including a four counter consisting of two binary connected triggers, said four counter being connected to said eight counter.

7. In a read-in circuit for use with a record controlled accounting machine a pulse generator for delivering a plurality of timed bursts each burst containing a predetermined number of random pulses, and each burst being initiated at a predetermined machine time, said pulse generator including a first trigger, a second trigger, an electronic switch, a first counter and a second counter, means coupling said first trigger, said second trigger, said electronic switch, said first counter and said second counter respectively in the afore-recited order, said second counter having an output terminal and means for coupling said output terminal to said second trigger, means operative at predetermined machine times for setting preselected counts in said second counter, means for switching said first trigger to its "on" position and thereby initiating a burst of pulses.

8. In a read-in circuit for use with a record controlled accounting machine a pulse generator adapted to deliver a plurality of groups of pulses, each group consisting of a different definite predetermined number of pulses, and each group being initiated at a predetermined machine time said pulse generator including a first trigger, a second trigger, an electronic switch, a binary four counter, and a decade counter, means coupling said first trigger, said second trigger, said electronic switch, said binary four counter and said decade counter respectively in the afore-recited order, said decade counter having an output terminal and means for coupling said output terminal to said second trigger, means for setting predetermined different counts in said decade counter at predetermined machine times, means for switching said first trigger to its "on" position and thereby initiating a group of pulses.

9. In a read-in circuit for use with a record controlled accounting machine a pulse generator adapted to deliver a plurality of timed bursts each burst containing a predetermined number of random pulses, and each burst being initiated at a predetermined machine time, said pulse generator including a first trigger, a second trigger, an electronic switch, a binary four counter and a binary eight counter, means coupling said first trigger, said second trigger, said electronic switch, said binary four and said binary eight counter respectively in the afore-recited order, said binary eight counter having an output terminal and means for coupling said output terminal to said second trigger, means for setting predetermined different counts in said binary eight counter at predetermined machine times, means for switching said first trigger to its "on" position and thereby initiating a burst of pulses.

10. A read-in circuit for use with a record controlled accounting machine comprising: a pulse generator for delivering a plurality of timed bursts of pulses each burst containing a predetermined number of random pulses, and each burst being initiated at a predetermined machine time, said pulse generator including a first electronic trigger, a second electronic trigger, an electronic switch, a first counter, and a second counter, means coupling said first electronic trigger, said second electronic trigger, said electronic switch, said first counter and said second counter respectively in the afore-recited order, said second counter having an output terminal, means for coupling said output terminal to said second trigger, means for setting preselected different counts in said second counter at predetermined machine times, means for switching said first trigger to its "on" position and thereby initiating a burst of pulses; a master electronic trigger, means for controlling said master trigger, and a second electronic switch controlled by said master trigger; record reading means; sign storage means including a sign storage trigger, a third electronic switch and means coupling said third switch respectively to said master trigger, said sign storage trigger and said record reading means; additional electronic switch means jointly controlled by said second electronic switch and said record reading means; factor storage means coupled to said additional electronic switch means; and electronic reset means including a "positive or" switch, a power switch, a power unit, and means interconnecting said "positive or" switch with said master trigger and, respectively, with said power switch and said power unit.

11. A read-in circuit for use with a record controlled accounting machine comprising a pulse generator adapted to deliver a plurality of timed groups of pulses, each group containing a predetermined number of random pulses, and each group being initiated at a predetermined machine time, said pulse generator including electronic trigger means, electronic switch means, electronic counter means and means coupling said electronic trigger means, said electronic switch means and said electronic counter means, means for setting preselected different counts at predetermined machine times in at least a portion of said counter means, and means associated with said electronic trigger means for successively initiating a different group of pulses each group being initiated at predetermined machine times; master electronic switch means, means for controlling said master electronic switch means and second electronic switch means controlled by said master switch means: record reading means; sign storage means, and means for controlling said sign storage means; additional electronic switch means jointly controlled by said second electronic switch means and said record reading means; storage means coupled to said additional electronic switch means; and reset means for resetting said trigger means, said counter means, said sign storage means and said storage means.

12. A read-in circuit for use with a record controlled accounting machine comprising: a pulse generator for delivering a plurality of timed bursts of pulses, each burst containing a predetermined number of random pulses, and each burst being initiated at a predetermined machine time, said pulse generator including a first electronic trigger, a second electronic trigger, an electronic switch, frequency conversion means, and a decade counter, means coupling said first electronic trigger, said second electronic trigger, said electronic switch, said frequency conversion means and said decade counter in the afore-recited order, said decade counter having its output terminal connected to said second trigger, means for setting preselected different counts in said decade counter at predetermined machine times, means for switching said first trigger to its "on" position and thereby initiating a burst of pulses; a master electronic trigger, means for controlling said master trigger, and a second electronic switch controlled by said master trigger; record sensing means; sign storage means including a sign storage trigger, a third electronic switch and means coupling said third switch respectively to said master trigger, said sign storage trigger and said record sensing means; additional electronic switch means jointly controlled by said second electronic switch and said record sensing means; factor storage means coupled to said additional switch means; and electronic reset means including a "positive or" switch, a power switch, a power unit, and means interconnecting said "positive or" switch with said master trigger and respectively with said power switch and power unit.

13. A read-in circuit for use with a record controlled accounting machine, comprising in combination, a pulse generator adapted to deliver a plurality of pulses, each burst consisting of a predetermined number of discrete pulses, and each burst being initiated at a correspondingly predetermined time, said pulse generator including a pulse counter said counter initiating an impulse at the end of a predetermined count, means including cams for setting said counter to different predetermined counts at corresponding machine times, a gating trigger operable to an "on" and "off" condition, said gating trigger, in being turned "on" and "off," developing an output gating pulse, means for turning the gating trigger "on," said gating trigger being turned "off" by the impulse from said counter, a gating means, a source of continuous discrete pulses jointly controlled by the gating means and the output gating pulse of said gating trigger for conversion to bursts of pulses; record sensing means, and other gating means controlled by said record sensing means for transmitting said delivered pulses.

14. A circuit for reading a value from a record, said value being represented by perforations at various index positions on said record according to a chosen code, comprising, a pulse generator for delivering bursts of pulses at index times representative of each index position, each burst consisting of a predetermined number of pulses according to said code, said pulse generator comprising a pulse counter, said counter initiating an impulse at the end of a predetermined count, means including cams for setting said counter to different predetermined counts at predetermined machine times, a gating trigger operable to an "on" and "off" condition, said gating trigger, in being turned "on" and "off," developing an output gating pulse, means for turning the gating trigger "on," said gating trigger being turned "off" by the impulse from said pulse counter, a source of continuous discrete pulses, a gating means jointly controlled by the output gating pulse from said gating trigger and said continuous discrete pulses for the transmittal of bursts of pulses, the number of said pulses in the burst depending on the particular gating pulse applied to said first gating means, means connecting said gating means to said counter; means for sequentially sensing each of said index position perforations, and a second gating means, controlled by said record means, for transmitting said bursts of pulses from said first gating means.

References Cited in the file of this patent

UNITED STATES PATENTS

| | | |
|---|---|---|
| 2,250,847 | Torkelson | July 29, 1941 |
| 2,396,229 | Blakely | Mar. 12, 1946 |
| 2,514,036 | Dickinson | July 4, 1950 |